United States Patent [19]

Bloomer et al.

[11] Patent Number: 5,787,270
[45] Date of Patent: Jul. 28, 1998

[54] METHOD AND APPARATUS FOR INTRUSIVE TESTING OF THE PERFORMANCE-ENHANCING FEATURES OF AN ADVANCED MICROPROCESSOR

[75] Inventors: Charles T. Bloomer; James F. Headley; Jody A. McCoy; Leo J. Klaes, Jr., all of Austin, Tex.

[73] Assignee: Advanced Micro Devices

[21] Appl. No.: 559,503

[22] Filed: Nov. 15, 1995

[51] Int. Cl.$^6$ .................................................. G06F 9/455
[52] U.S. Cl. ................ 395/500; 395/183.04; 395/183.05
[58] Field of Search ........................ 371/21.1, 24, 25.1;
364/579, 578, 580, 232.3, 267, 267.91,
927.81; 395/183.13, 183.17, 500, 183.04,
183.05, 183.19

[56] References Cited

U.S. PATENT DOCUMENTS

| | | | |
|---|---|---|---|
| 4,868,822 | 9/1989 | Scott et al. | 371/16 |
| 5,136,590 | 8/1992 | Polstra et al. | 371/16.2 |
| 5,345,580 | 9/1994 | Tamaru et al. | 395/500 |
| 5,572,665 | 11/1996 | Nakabayashi | 395/183.04 |
| 5,640,337 | 6/1997 | Huang et al. | 364/578 |

FOREIGN PATENT DOCUMENTS 58-195903(A) 11/1983 Japan .......................................... 23/2

*Primary Examiner*—Kevin J. Teska
*Assistant Examiner*—Raymond H. Dalziel
*Attorney, Agent, or Firm*—Kevin L. Daffer; Conley, Rose & Tayon

[57] ABSTRACT

The present invention includes a method and apparatus for performing intrusive testing upon a microprocessor to ensure the absence of errors or defects in performance-enhancing features and related control circuitry which affect the results of software instructions being executed by the microprocessor. In the intrusive testing method, an intrusive testing unit capable of generating logic signals is coupled between a computer system motherboard and a microprocessor. The microprocessor is then caused to execute a test software program. As the microprocessor executes the test software program, the intrusive testing unit generates logic signals (alternate control signals) at regular intervals. Control signals generated by system hardware on the motherboard in response to program execution are logically combined with alternate control signals generated by the intrusive testing unit. Resulting output control signals are applied to the control signal pins of the microprocessor. The intrusive testing unit thus ensures a large number of control signals are applied to the microprocessor in a relatively short period of time. The computer system is monitored to determine proper execution of the test software program.

21 Claims, 16 Drawing Sheets

METHOD AND APPARATUS FOR INTRUSIVE TESTING OF THE PERFORMANCE-ENHANCING FEATURES OF AN ADVANCED MICROPROCESSOR

BACKGROUND OF THE INVENTION

Incorporated herein is a listing of a computer text file containing a description of the digital logic hardware of a preferred embodiment of the intrusive testing unit of the present invention. The description is written in the MACHXL hardware design language developed by Advanced Micro Devices, Sunnyvale, Calif., for the Macro array CMOS high-density (MACH) family of programmable logic devices. The information in this program was used to electrically configure a MACH435 device to perform the logical operations specified. Copyright, 1995, Advanced Micro Devices, Inc. A portion of the disclosure to this patent document contains material which is subject to copyright protection. Advanced Micro Devices reserves all copyrights whatsoever to all materials contained in the incorporated computer text file.

1. Field of the Invention

This invention relates to electronic circuits and more specifically to the functional testing of digital microprocessors.

2. Description of the Relevant Art

A digital microprocessor is typically designed and manufactured to meet a set of functional and performance specifications. Many different types of testing are performed to ensure a microprocessor produces correct results in all possible operating modes and with all allowable input combinations. Functional testing typically includes placing a microprocessor under test in a known state, applying known input signals, recording the responses, and comparing the responses to expected responses derived from a functional specification. Any deviation of recorded responses from expected responses represents a failure of a functional test.

Modern microprocessors include performance-enhancing features such as internal cache memory systems, operating modes which determine the amount of power dissipated by the microprocessor, and features which allow the microprocessor to operate in a multiprocessor environment (i.e., an environment in which two or more microprocessors share a common system bus). Dedicated control input terminals (i.e., pins) on the microprocessor package allow the computer system hardware to exercise control over the operation of these internal features in order to increase the performance of the system. Control over these features should thus affect the performance of the microprocessor, but should not affect the results of operations performed by the microprocessor.

It is possible, however, for design errors or manufacturing defects in performance-enhancing features and related control circuitry to affect the results of software instructions being executed by a microprocessor. Functional testing of performance-enhancing features is thus also required to ensure the absence of such errors and defects. Common functional testing approaches do not target performance-enhancing features, however. It would thus be advantageous to have a testing method and apparatus to ensure the absence of design errors or manufacturing defects in performance-enhancing features and related control circuitry of a microprocessor which affect the results of software instructions being executed by the microprocessor.

SUMMARY OF THE INVENTION

The present invention includes a method and apparatus for performing intrusive testing upon a microprocessor to ensure the absence of errors or defects in performance-enhancing features and related control circuitry of the microprocessor. As defined herein, intrusive testing is a hardware-based testing approach designed to exercise control over certain internal features of a microprocessor during software instruction execution. During intrusive testing, an intrusive testing unit capable of generating logic signals is coupled between a computer system motherboard and a microprocessor under test. The microprocessor is then caused to execute a test software program. As the microprocessor executes the test software program, the intrusive testing unit generates logic signals (alternate control signals) at regular intervals. Control signals generated by system hardware on a motherboard in response to program execution are logically combined with alternate control signals generated by the intrusive testing unit to form output control signals. The resulting output control signals are applied to the control signal pins of the microprocessor. The intrusive testing unit thus ensures a large number of control signals are applied to the microprocessor in a relatively short period of time. The computer system is monitored to ensure the microprocessor is able to make internal feature configuration changes while still generating correct program results.

The intrusive testing unit of the present invention includes a bus mastering counter unit, a bus mastering decoder/synchronizer unit, a bus mastering source select unit, a cache write policy counter unit, a cache write policy decoder/synchronizer unit, a cache write policy source select unit, an interrupt counter unit, an interrupt decoder/synchronizer unit, and an interrupt source select unit. The bus mastering counter unit is a sequential digital circuit implementing a binary up counter. The bus mastering counter unit receives a clock signal from a motherboard and provides counter state signals to the bus mastering decoder/synchronizer unit. The bus mastering decoder/synchronizer unit receives one or more counter state signals from the bus mastering counter unit and provides an alternate bus arbitration control signal to the bus mastering source select unit derived from the counter state signals from the bus mastering counter unit. The bus mastering source select unit receives a corresponding bus arbitration control signal from the motherboard along with the alternate bus arbitration control signal from the bus mastering decoder/synchronizer, and provides an output bus arbitration control signal to the microprocessor. The output bus arbitration control signal is a logical combination of the bus arbitration control signal from the motherboard and the alternate bus arbitration control signal from the bus mastering decoder/synchronizer.

The bus mastering decoder/synchronizer unit may also receive an input signal from an external pulse generator and provide an additional alternate bus arbitration control signal to the bus mastering source select unit. In this case, the output bus arbitration control signal provided to the microprocessor by the bus mastering source select unit is a logical combination of the bus arbitration control signal from the motherboard, the alternate bus arbitration control signal derived from the counter state signals from the bus mastering counter unit, and the alternate bus arbitration control signal derived from the input signal from the external pulse generator.

The cache write policy counter unit is also a sequential digital circuit implementing a binary up counter. The cache write policy counter unit receives a clock signal from the motherboard and provides counter state signals to the cache write policy decoder/synchronizer unit. The cache write policy decoder/synchronizer unit receives one or more counter state signals from the cache write policy counter unit and provides an alternate write-back cache control signal to the cache write policy source select unit. The cache write policy source select unit receives a corresponding write-back cache control signal from the motherboard along with the alternate write-back cache control signal from the cache write policy decoder/synchronizer, and provides an output write-back cache control signal to the microprocessor. The output write-back cache control signal is a logical combination of the write-back cache control signal from the motherboard and the alternate write-back cache control signal from the cache write policy decoder/synchronizer.

The cache write policy decoder/synchronizer unit may also receive an input signal from an external pulse generator and provide an additional alternate write-back cache control signal to the cache write policy source select unit. In this case, the output write-back cache control signal provided to the microprocessor by the cache write policy source select unit is a logical combination of the write-back cache control signal from the motherboard, the alternate write-back cache control signal derived from the counter state signals from the cache write policy counter unit, and the alternate write-back cache control signal derived from the input signal from the external pulse generator.

The interrupt counter unit is also a sequential digital circuit implementing a binary up counter. The interrupt counter unit receives a clock signal from the motherboard and provides counter state signals to the interrupt decoder/synchronizer unit. The interrupt decoder/synchronizer unit receives one or more counter state signals from the interrupt counter unit and provides an alternate control interrupt signal to the interrupt source select unit. The interrupt source select unit receives corresponding control interrupt signals from the motherboard along with alternate control interrupt signals from the interrupt decoder/synchronizer, and provides output control interrupt signals to the microprocessor. The output control interrupt signals are logical combinations of control interrupt signals from the motherboard and the corresponding alternate control interrupt signals from the interrupt decoder/synchronizer.

The interrupt decoder/synchronizer unit may also receive an input signal from an external pulse generator and provide an additional alternate control interrupt signal to the interrupt source select unit. In this case, the output control interrupt signal provided to the microprocessor by the interrupt source select unit is a logical combination of the control interrupt signal from the motherboard, the alternate control interrupt signal derived from the counter state signals from the interrupt counter unit, and the alternate control interrupt signal derived from the input signal from the external pulse generator.

BRIEF DESCRIPTION OF THE DRAWINGS

Other objects and advantages of the invention will become apparent upon reading the following detailed description and upon reference to the accompanying drawings in which.

Figure 1:
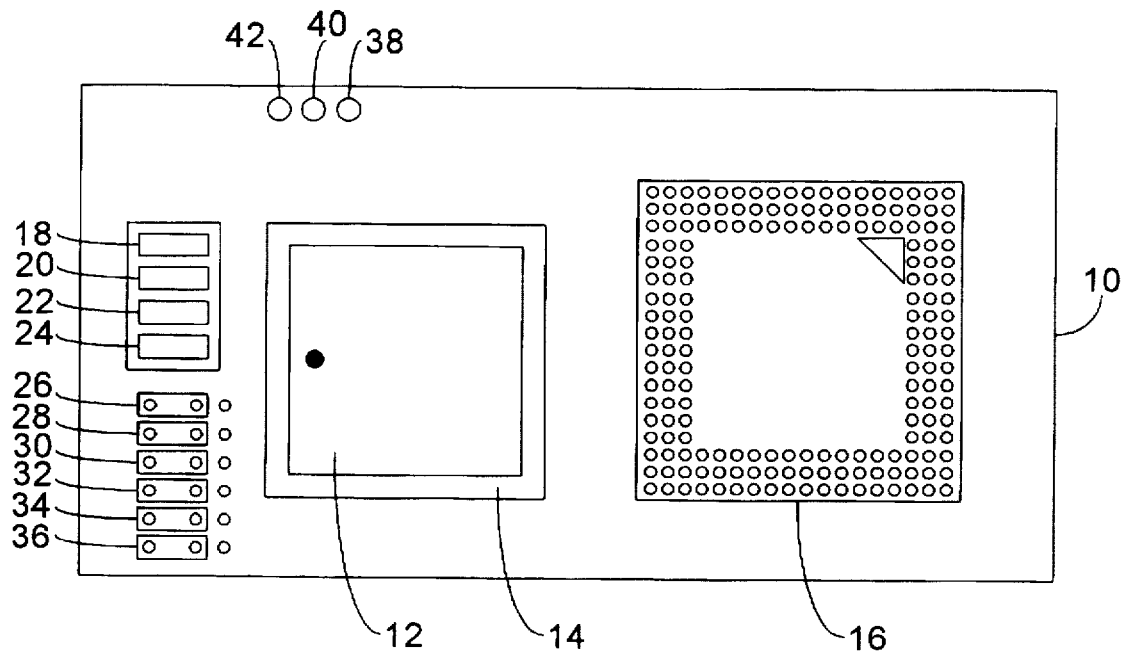
FIG. 1 is a top plan view of a daughterboard including a programmable logic device (PLD) programmed to perform a set of digital logic functions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

One example of a modern microprocessor is the Enhanced Am486™ microprocessor manufactured by Advanced Micro Devices, Sunnyvale, Calif. The Enhanced Am486™ microprocessor is based on the well known 486 microprocessor architecture with added performance-enhancing features including write-back capability for the internal cache memory system and power management features which provide control of the processor clock frequency. The Enhanced Am486™ microprocessor has several dedicated input pins for control signals, including Bus Hold (HOLD), Write-Back/Write-Through (WB/WT#), System Management Interrupt (SMI#), Cache Flush (FLUSH#), and Stop Clock (STPCLK#). Signal names followed by '#' are active low, meaning the signal is active or asserted when the signal voltage is low. Detailed information about the operation of the Enhanced Am486™ microprocessor may be found in the data book entitled *Enhanced Am486™ Microprocessor Family* by Advanced Micro Devices, Sunnyvale, Calif., Publication #GP12, Issue Date February 1995, (herein incorporated by reference). Intrusive testing, implemented using the method and apparatus of the present invention, may be employed to test performance-enhancing features of the Enhanced Am486™ microprocessor.

A microprocessor (i.e., processor) is typically coupled to a processor bus along with other devices. Devices coupled to a processor bus and which are able to take control of the processor bus are called bus masters. Bus Hold (HOLD) is a bus arbitration signal issued by a bus master to request control of the processor bus. In response to a HOLD signal, a 486 processor will place most of its input/output pins in a high-impedance state after completing a bus cycle in progress. The processor will maintain this configuration until the HOLD signal is deasserted. When HOLD is deasserted, the processor may again access the processor bus.

The Write-Back/Write-Through (WB/WT#) signal enables use of the internal cache memory (i.e., cache) in the write-back mode and allows system hardware to define a line in the cache as write-through or write-back. In order to enable the write-back mode, the WB/WT# signal must be driven high for two clock cycles before and after assertion of the RESET signal. With the write-back mode enabled, system hardware may use the WB/WT# signal to define a line in the cache as write-through or write-back. During this definition, the WB/WT# signal is sampled in the same clock as the first RDY# or BRDY# signal is returned during a cache line fill (i.e., allocation) cycle.

The SMI# signal triggers a non-maskable interrupt request to invoke the system management mode (SMM). The SMM, accessible only by system hardware, enables functions such as power management and security. The SMI# signal is an asynchronous input latched on the falling edge and recognized on an instruction execution boundary. The processor responds to the SMI# signal by asserting a SMIACT# signal after entering SMM.

The FLUSH# signal is a cache control signal which causes the processor to flush (i.e., invalidate) the contents of the internal cache memory. The flush operation is more complicated for enhanced 486 microprocessors with write-back capability and operating in the write-back mode. In this case, the FLUSH# signal is treated as an interrupt signal and recognized on an instruction execution boundary. In write-back mode, all modified lines in the cache must be written back to system memory before invalidation. After all modified lines are written back, two special flush acknowledge cycles are issued by the processor.

The STPCLK# signal is an interrupt request to disable the external system clock (CLK) input. Like other interrupt signals, the STPCLK# signal is recognized on an instruction execution boundary. STPCLK# must remain asserted until the processor enters the Stop Grant clock control state. When the processor recognizes a STPCLK# interrupt, it ceases instruction execution, generates a Stop Grant bus cycle, and stops the internal clock. Once the processor is in the Stop Grant state, the external CLK input may be changed or stopped. The STPCLK# input must be deasserted (i.e., driven to a high voltage level) in order to restart the internal clock and continue instruction execution.

Each of the above external signals causes a change in the internal configuration of the microprocessor. These changes may affect the performance of the microprocessor, but should not affect the results of software instructions being executed simultaneously. Intrusive testing evaluates the ability of a microprocessor to make these internal changes while still generating correct program results. The intrusive testing apparatus of the present invention will first be described, followed by a description of an intrusive testing method involving the use of the intrusive testing apparatus.

An intrusive testing unit is preferably embodied within a programmable logic device (PLD) on a daughterboard coupled between a computer system motherboard and a microprocessor. The particular PLD described is a complementary metal oxide semiconductor (CMOS) MACH435 device manufactured by Advanced Micro Devices, Sunnyvale, Calif. The MACH435 is one of a family of macro array CMOS high-density (MACH) devices. The 84-pin MACH435 comes in a plastic leaded chip carrier (PLCC) package. Macro array CMOS high-density (MACH) devices consist of programmable array logic (PAL) blocks of electrically-erasable CMOS circuitry interconnected by a central switch matrix. The switch matrix connects PAL blocks to each other and to input pins. All signals incur the same delay times through a MACH device regardless of signal routing. Special software partitions a design, specifies PAL block placement, and configures the central switch. MACH devices may be programmed on standard logic programmers, and may be erased and reprogrammed. The present invention may also be implemented using a field programmable gate array (FPGA), field programmable logic array (FPLA), other well-known digital logic devices, or any combination of the above.

Figure 2:
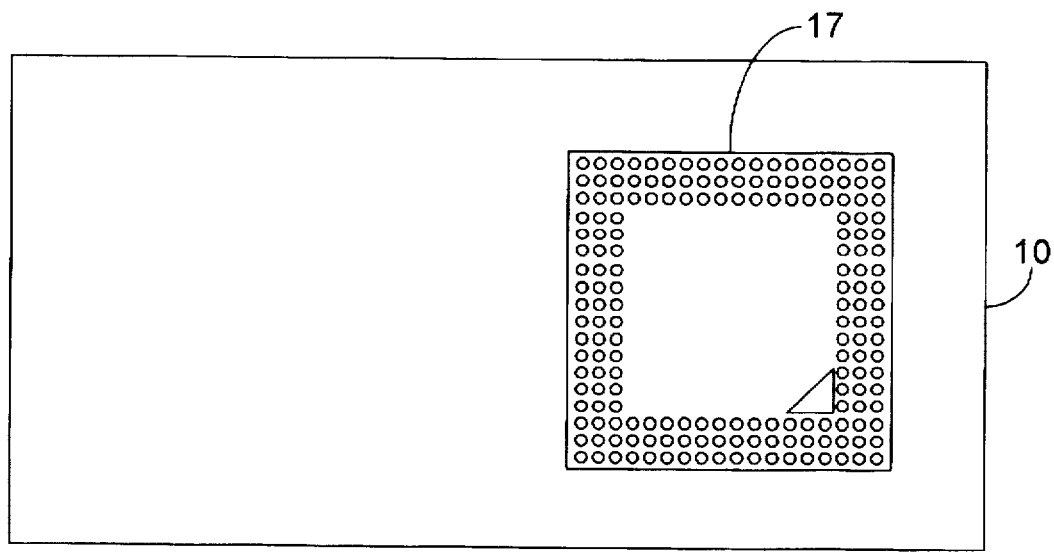
FIG. 2 is a bottom plan view of the daughterboard.

FIG. 1 is a top (i.e., plan) view of a daughterboard 10 including a PLD 12 programmed to perform the digital logic functions described below. PLD 12 is seated in PLD socket 14. Daughterboard 10 is a printed circuit board with conductive traces which interconnect components including, for example, a daughterboard microprocessor socket 16, a first switch 18, a second switch 20, a third switch 22, a fourth switch 24, a first jumper 26, a second jumper 28, a third jumper 30, a fourth jumper 32, a fifth jumper 34, a sixth jumper 36, a first light-emitting diode (LED) 38, a second LED 40, and a third LED 42. FIG. 2 is a bottom view of daughterboard 10. A daughterboard pin grid array 17 is visible in FIG. 2, positioned directly opposite daughterboard microprocessor socket 16.

Figure 3:
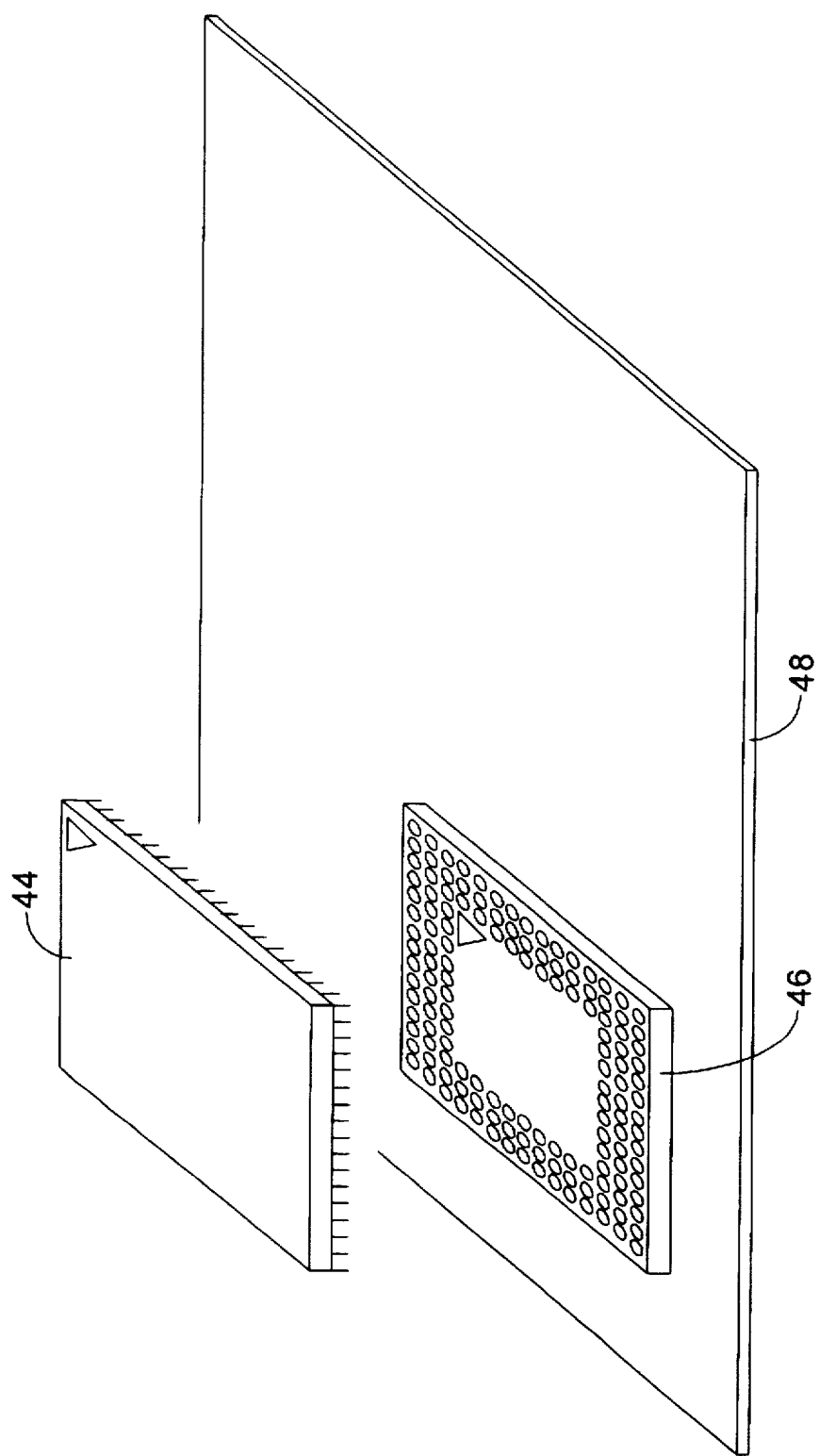
FIG. 3 is an isometric view of a microprocessor being removed from a microprocessor socket on a motherboard of a computer system.
Figure 4:
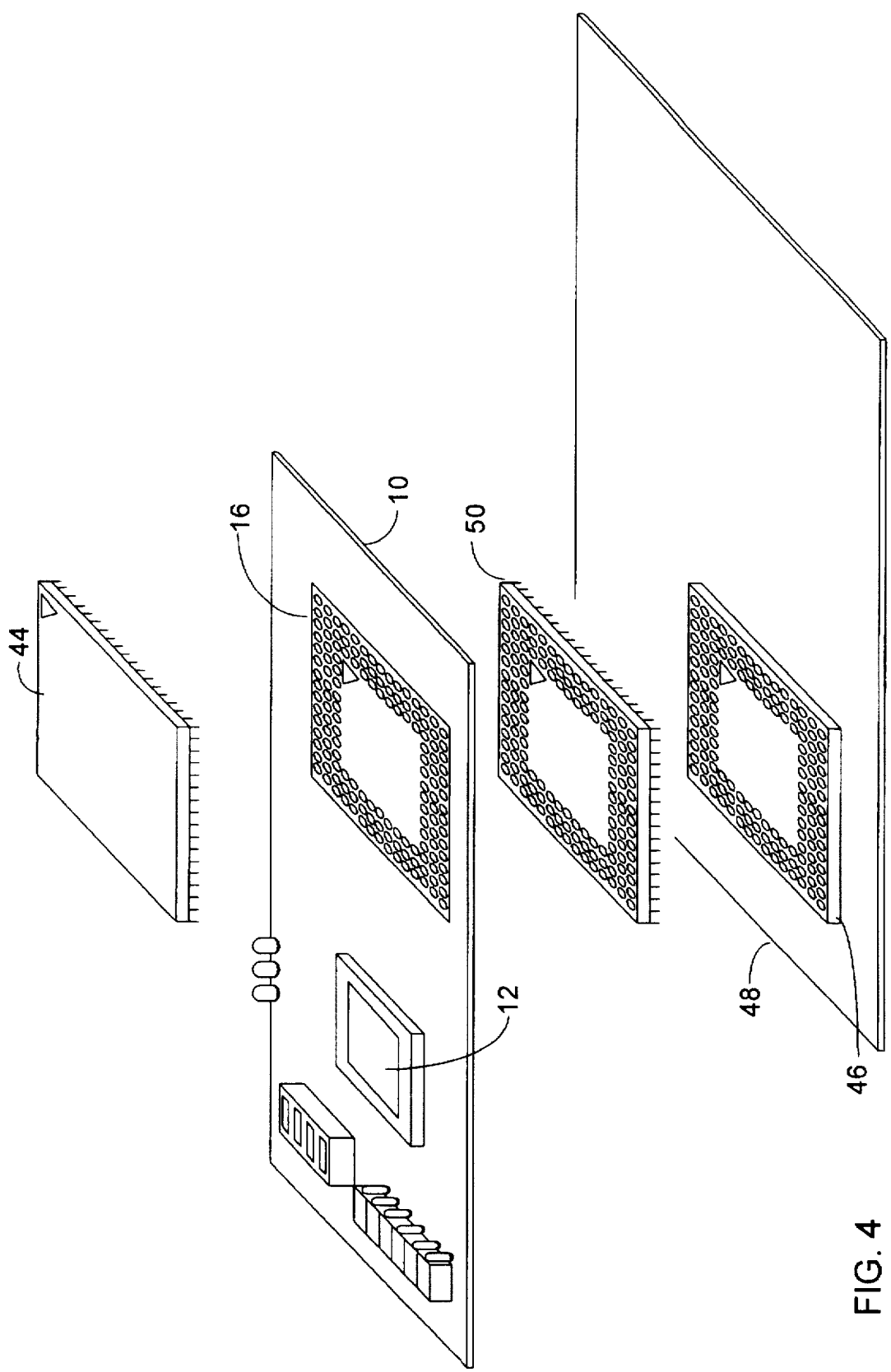
FIG. 4 is an isometric view of the daughterboard being coupled to the motherboard, and the microprocessor being inserted into an electrical receptacle on the daughterboard.

FIGS. 3 and 4 will be used to describe how daughterboard 10 is installed for use during intrusive testing. A microprocessor 44 is first removed from a motherboard microprocessor socket 46 on a motherboard 48 as shown in FIG. 3. Pins of daughterboard pin grid array 17 are inserted into a socket on one side of adapter 50 (FIG. 4). As shown in FIG. 4, pins of a pin grid array on the other side of adapter 50 are inserted into corresponding receptacles of empty motherboard microprocessor socket 46. The pins of microprocessor 44 are then inserted into corresponding receptacles of daughterboard microprocessor socket 16 on daughterboard 10. Daughterboard 10 and all components, including PLD 12, are thus coupled between motherboard 48 and microprocessor 44.

Daughterboard 10 receives all processor-related logic signals from motherboard 48 via adapter 50 and daughterboard pin grid array 17. Most of these signals are coupled to components of daughterboard 10 and to pins of microprocessor 44, via daughterboard microprocessor socket 16, in parallel. Some logic signals are modified as described below by intrusive testing unit 52 prior to being coupled to pins of microprocessor 44 via daughterboard microprocessor socket 16. Logic equations used to describe how logic signals are generated use the following logical operators:

| Logical Operator | Logical Operation |
|---|---|
| • | AND |
| + | OR |
| ' | COMPLEMENT (INVERSE) |
| ⊕ | EXCLUSIVE OR |

Figure 5:
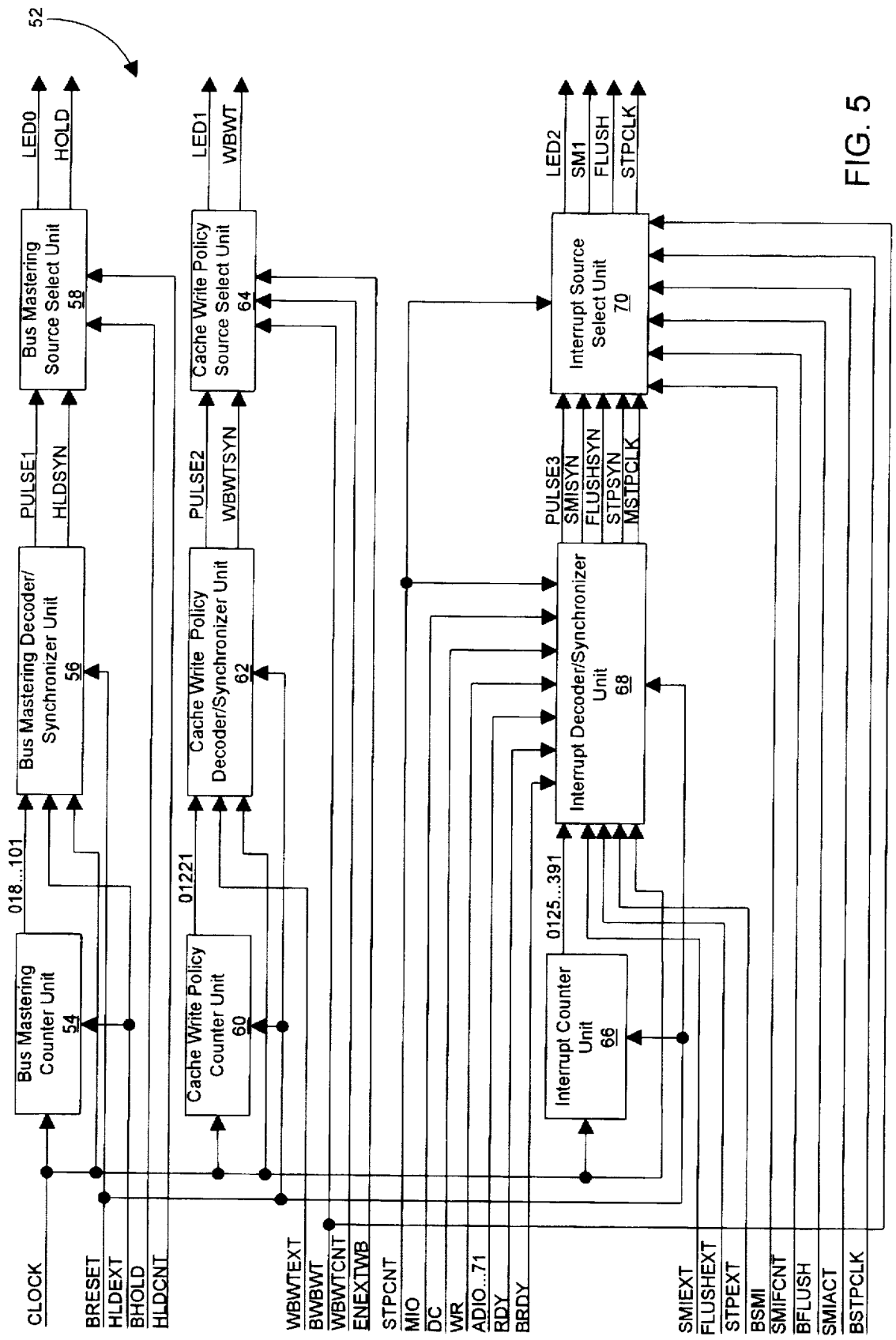
FIG. 5 is a block diagram of an intrusive testing unit embodied within the PLD on the daughterboard.

FIG. 5 is a block diagram of an intrusive testing unit 52 embodied within PLD 12. Intrusive testing unit 52 includes a bus mastering counter unit 54, a bus mastering decoder/synchronizer unit 56, a bus mastering source select unit 58, a cache write policy counter unit 60, a cache write policy decoder/synchronizer unit 62, a cache write policy source select unit 64, an interrupt counter unit 66, an interrupt decoder/synchronizer unit 68, and an interrupt source select unit 70. Bus mastering counter unit 54 is coupled to bus mastering decoder/synchronizer unit 56, and bus mastering decoder/synchronizer unit 56 is coupled to bus mastering source select unit 58. Cache write policy counter unit 60 is coupled to cache write policy decoder/synchronizer unit 62, and cache write policy decoder/synchronizer unit 62 is coupled to cache write policy source select unit 64. Interrupt counter unit 66 is coupled to interrupt decoder/synchronizer unit 68, and interrupt decoder/synchronizer unit 68 is coupled to interrupt source select unit 70. Input signals to functional units of intrusive testing unit 52 from motherboard 48 arrive at input pins of PLD 12 through signal lines coupled to daughterboard pin grid array 17 thereafter coupled to motherboard microprocessor socket 46 on motherboard 48.

Figure 6:
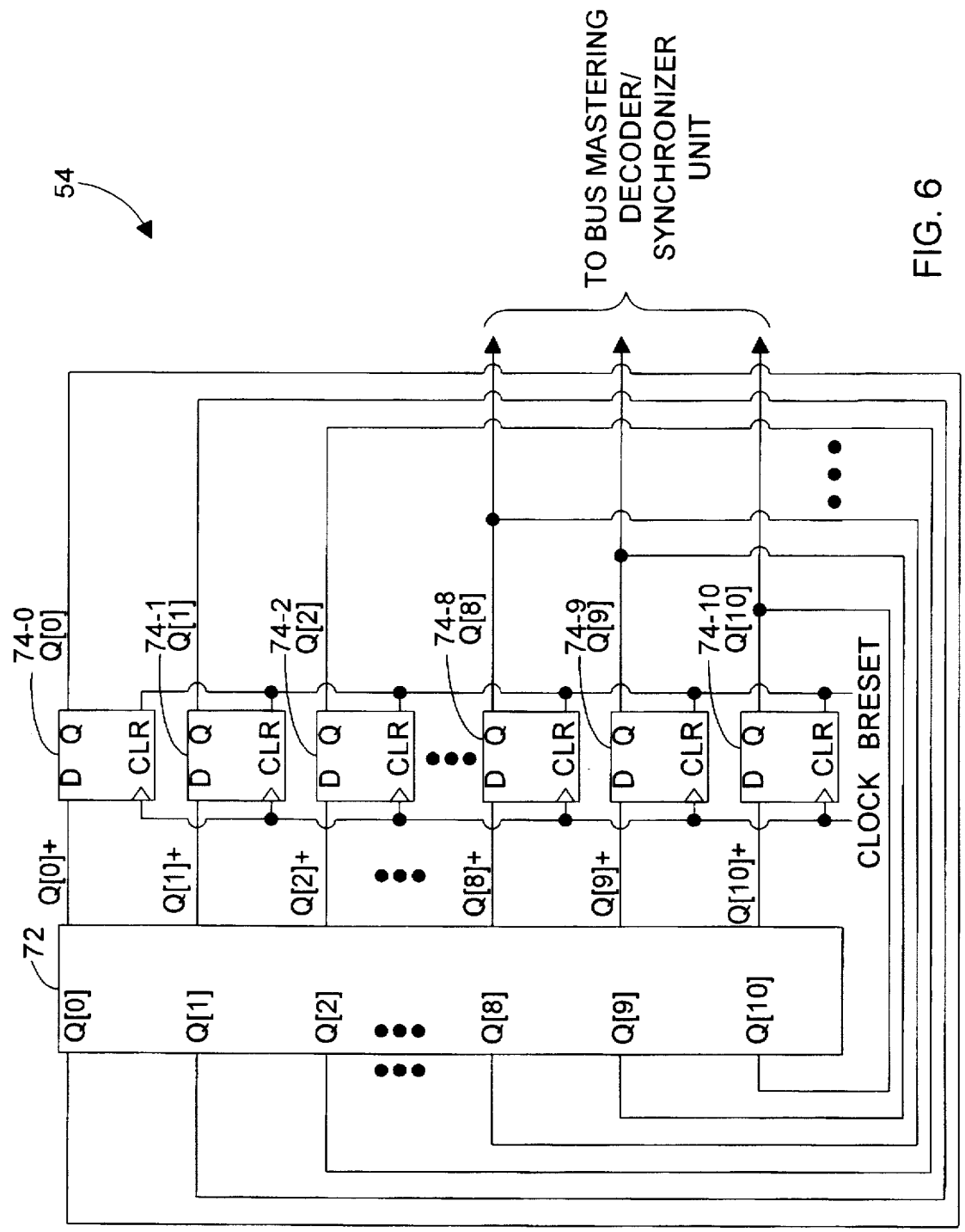
FIG. 6 is a block diagram of a bus mastering counter unit of the intrusive testing unit.
Figure 7:
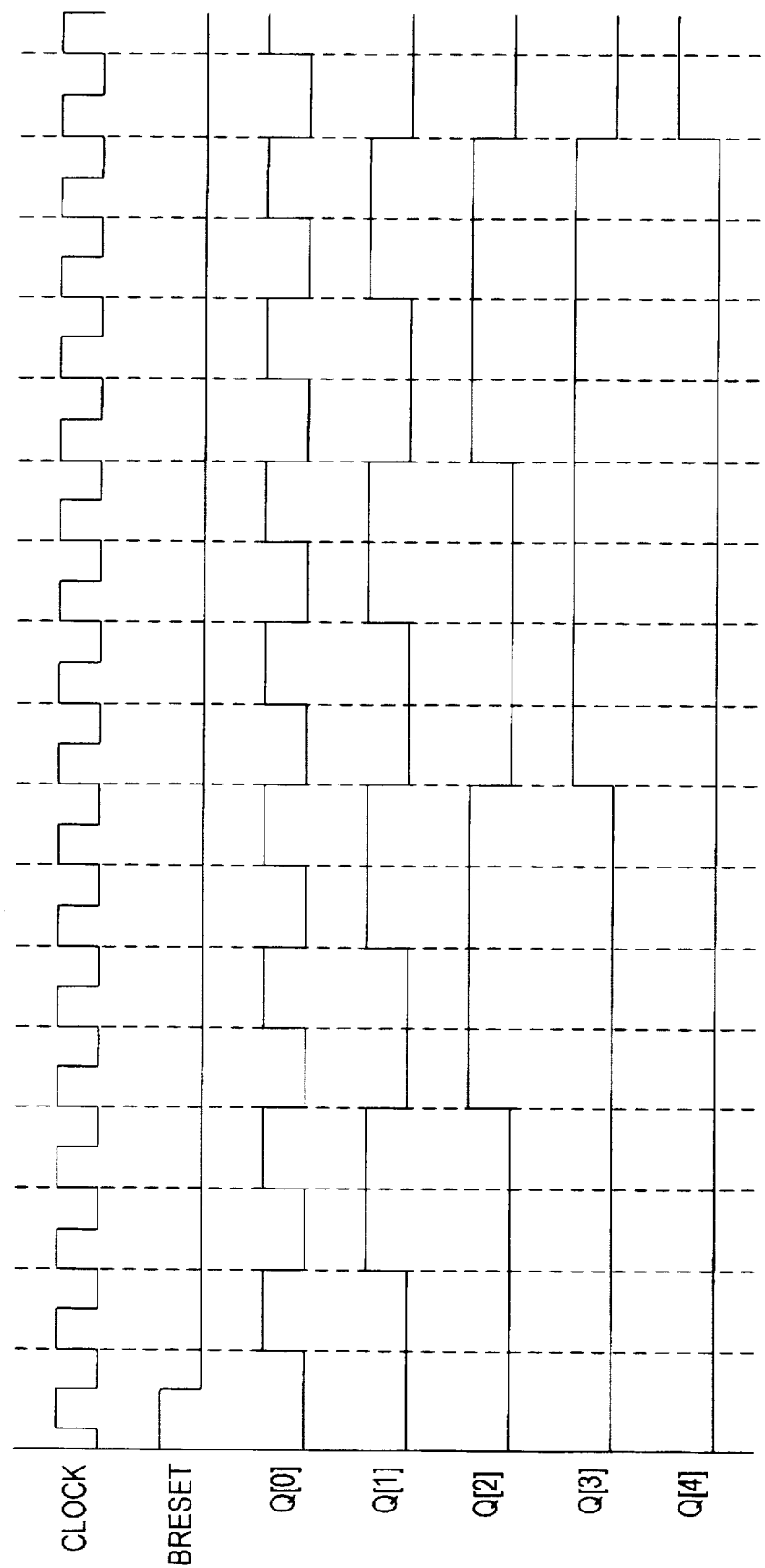
FIG. 7 is a timing diagram of the output signals of the first five D flip-flops of the bus mastering counter unit in response to input signals CLOCK and BRESET.

FIG. 6 is a block diagram of bus mastering counter unit 54. Bus mastering counter unit 54 includes a combinational subnetwork 72 coupled to clocked delay (D) flip-flops 74-0 through 74-10, referred to collectively as D flip-flops 74. D flip-flops 74 are clocked by an input signal CLOCK and cleared by an input signal BRESET generated by system hardware on motherboard 48. Combinational logic within combinational subnetwork 72 generates flip-flop next state (Q+) output values coupled to input terminals of D flip-flops 74 according to the following equations:

$Q[0]+=Q[0] \oplus 1$ $Q[1]+=Q[1] \oplus Q[0]$ $Q[2]+=Q[2] \oplus (Q[0] \cdot Q[1])$ $Q[3]+=Q[3] \oplus (Q[0] \cdot Q[1] \cdot Q[2])$ $Q[4]+=Q[4] \oplus (Q[0] \cdot Q[1] \cdot Q[2] \cdot Q[3])$ $Q[5]+=Q[5] \oplus (Q[0] \cdot Q[1] \cdot Q[2] \cdot Q[3] \cdot Q[4])$ $Q[6]+=Q[6] \oplus (Q[0] \cdot Q[1] \cdot Q[2] \cdot Q[3] \cdot Q[4] \cdot Q[5])$ $Q[7]+=Q[7] \oplus (Q[0] \cdot Q[1] \cdot Q[2] \cdot Q[3] \cdot Q[4] \cdot Q[5] \cdot Q[6])$ $Q[8]+=Q[8] \oplus (Q[0] \cdot Q[1] \cdot Q[2] \cdot Q[3] \cdot Q[4] \cdot Q[5] \cdot Q[6] \cdot Q[7])$ $Q[9]+=Q[9] \oplus (Q[0] \cdot Q[1] \cdot Q[2] \cdot Q[3] \cdot Q[4] \cdot Q[5] \cdot Q[6] \cdot Q[7] \cdot Q[8])$ $Q[10]+=Q[10] \oplus (Q[0] \cdot Q[1] \cdot Q[2] \cdot Q[3] \cdot Q[4] \cdot Q[5] \cdot Q[6] \cdot Q[7] \cdot Q[8] \cdot Q[9])$ D flip-flops 74 reproduce the logic values at input terminals (D) at output terminals (Q) at the rising edge of clock signal CLOCK. The outputs of D flip flops 74 are cleared (i.e., set to logic value 0) in response to an asserted BRESET signal. FIG. 7 is a timing diagram showing signal values at output terminals of D flip-flops 74-0, 74-1, 74-2, 74-3, and 74-4 in response to signals CLOCK and BRESET. Bus mastering counter unit 54 thus implements an 11-bit binary up counter. With D flip-flops 74 serving as memory elements and output signals generated by D flip-flops 74, bus mastering counter unit 54 is a Moore sequential network. Bus mastering counter unit 54 output signals Q[8], Q[9], and Q[10] are coupled to input terminals of bus mastering decoder/synchronizer unit 56.

Figure 8:
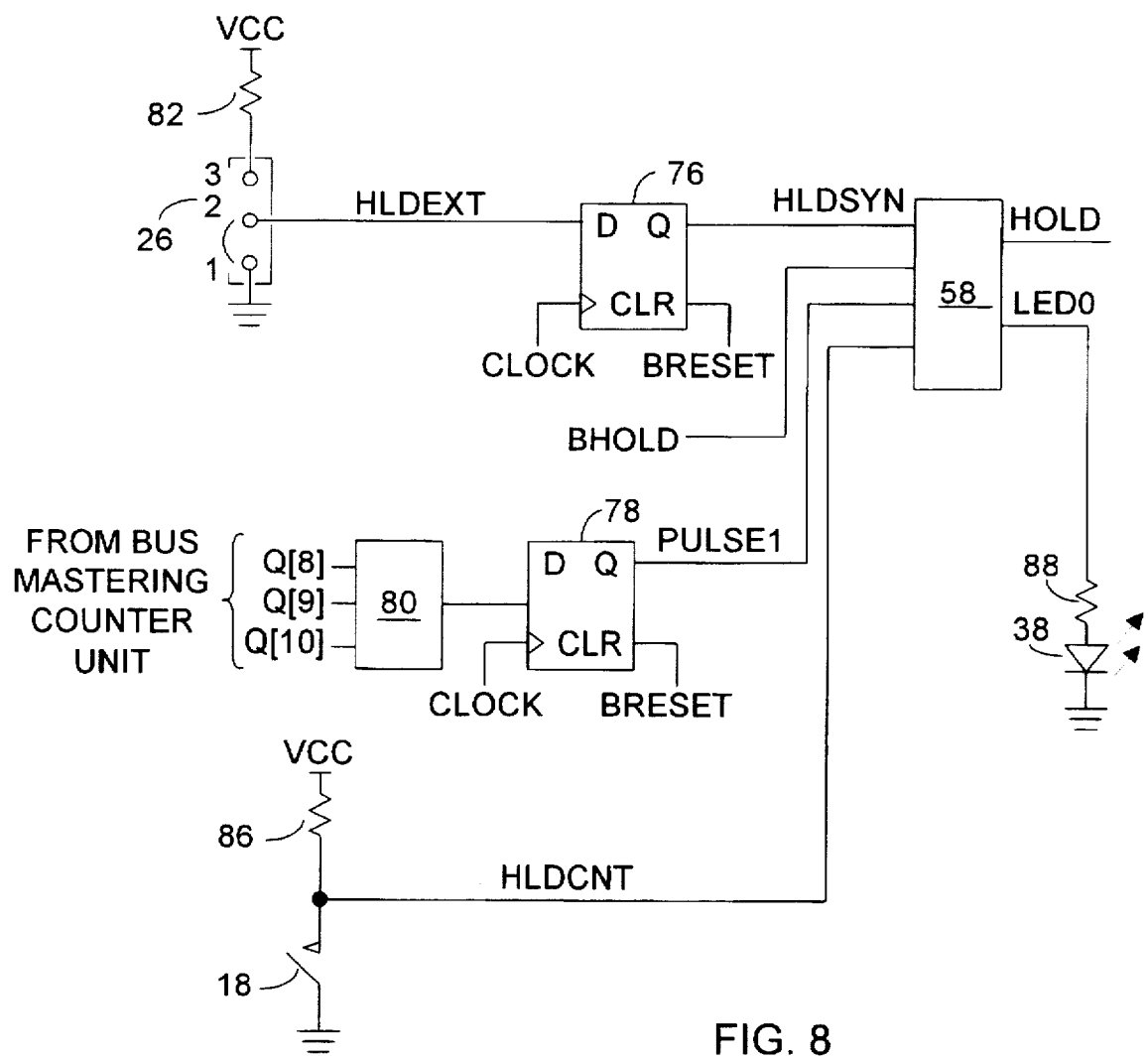
FIG. 8 is a block diagram of elements of a bus mastering decoder/synchronizer unit coupled to a bus mastering source select unit.

FIG. 8 is a block diagram of elements of bus mastering decoder/synchronizer unit 56 coupled to bus mastering source select unit 58. Elements of bus mastering decoder/synchronizer unit 56 include a first D flip-flop 76, a second D flip-flop 78, and a combinational subnetwork 80.

Figure 9:
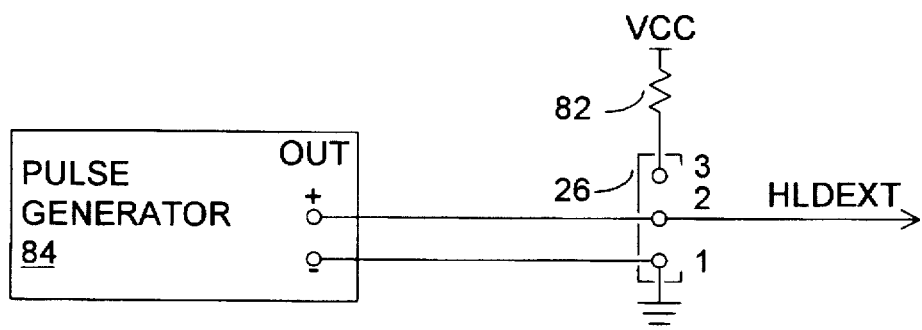
FIG. 9 is a block diagram of the output of an external pulse generator coupled to terminals of a jumper in order to generate a signal HLDEXT.

First jumper 26 provides for an External Hold (HLDEXT) signal. Signal HLDEXT originates from a second terminal of first jumper 26 and is applied to an input terminal of first D flip-flop 76. A first terminal of first jumper 26 is connected to a ground potential. A third terminal of first jumper 26 is connected to a system voltage supply level $V_{CC}$ through a first jumper resistor 82. When the second terminal of first jumper 26 is connected to the first terminal as shown in FIG. 8, signal HLDEXT is at a low voltage level (i.e., a logic 0). When the second terminal of first jumper 26 is connected to the third terminal, signal HLDEXT is at a high voltage level (i.e., a logic 1). The output of a pulse generator 84 may also be connected between the first and second terminals of first jumper 26 as shown in FIG. 9. In this case external pulse generator 84 generates signal HLDEXT.

First D flip-flop 76 synchronizes input signal HLDEXT to the system clock signal CLOCK, producing a signal HLDSYN at an output terminal. First D flip-flop 76 reproduces the logic value at input terminals (D) at output terminals (Q) at the rising edge of clock signal CLOCK. The output of first D flip-flop 76 is cleared (i.e., set to logic value 0) in response to an asserted BRESET signal.

Combinational subnetwork 80 has three input terminals coupled to signals Q[8], Q[9], and Q[10] produced by bus mastering counter unit 54. Combinational subnetwork 80 produces a single output signal with a logic value equal to:

Q[8]'•Q[9]'•Q[10]'

The output of combinational subnetwork 80 is coupled to an input terminal of second D flip-flop 78. Second D flip-flop 78 produces a signal PULSE1 at an output terminal. Signal PULSE1 is thus the output of combinational subnetwork 80 synchronized with the system clock signal CLOCK.

Bus mastering source select unit 58 has four input terminals and two output terminals. Bus mastering source select unit 58 receives input signals HLDSYN and PULSE1 from bus mastering decoder/synchronizer unit 56, a Hold signal (BHOLD) from motherboard 48, and a Hold Counter signal (HLDCNT) from first switch 18. Signal HLDCNT originates from a first terminal of first switch 18 connected to the system voltage supply level $V_{CC}$ through a first switch resistor 86. A second terminal of first switch 18 is connected to a ground potential. When first switch 18 is open as shown in FIG. 8, the first terminal of first switch 18 and signal HLDCNT are at a high voltage level (i.e., a logic 1). When first switch 18 is closed, the first terminal of first switch 18 and signal HLDCNT are at a low voltage level (i.e., a logic 0). Bus mastering source select unit 58 generates output signal HOLD at one output terminal according to the following logic equation:

$$HOLD=HLDSYN+BHOLD+(PULSE1 \cdot HLDCNT)$$

Output signal HOLD is coupled to the HOLD signal pin of microprocessor 44 seated in daughterboard microprocessor socket 16 of daughterboard 10. Output signal HOLD is asserted when signal HLDSYN is asserted or signal BHOLD from motherboard 48 is asserted. Output signal HOLD is also asserted when first switch 18 is closed (signal HLDCNT=0) and signal PULSE1 is asserted. Signal HOLD generated from the output of bus mastering source select unit 58 cycles between a high voltage level and a low voltage level. Since PULSE1 is a logic 1 for $2^8$ (256) of the $2^{11}$ (2,048) different output states of bus mastering counter unit 54, signal HOLD is a high voltage level about 12.5 percent of the period of each cycle (i.e., has a duty cycle of about 12.5 percent). A synchronized output signal from external pulse generator 84 may also be issued as signal HOLD. All bus hold requests generated by system hardware on motherboard 48 are also issued as signal HOLD via signal BHOLD from motherboard 48.

Bus mastering source select unit 58 also generates an output signal LED0:

$$LED0=HLDCNT$$

Signal LED0 is thus a high voltage level when first switch 18 is closed, enabling a HOLD signal to be generated by bus mastering source select unit 58 from outputs of bus mastering counter unit 54. When LED0 is a high voltage level, current flows through first LED resistor 88 and first LED 38, and first LED 38 is illuminated.

Figure 10:
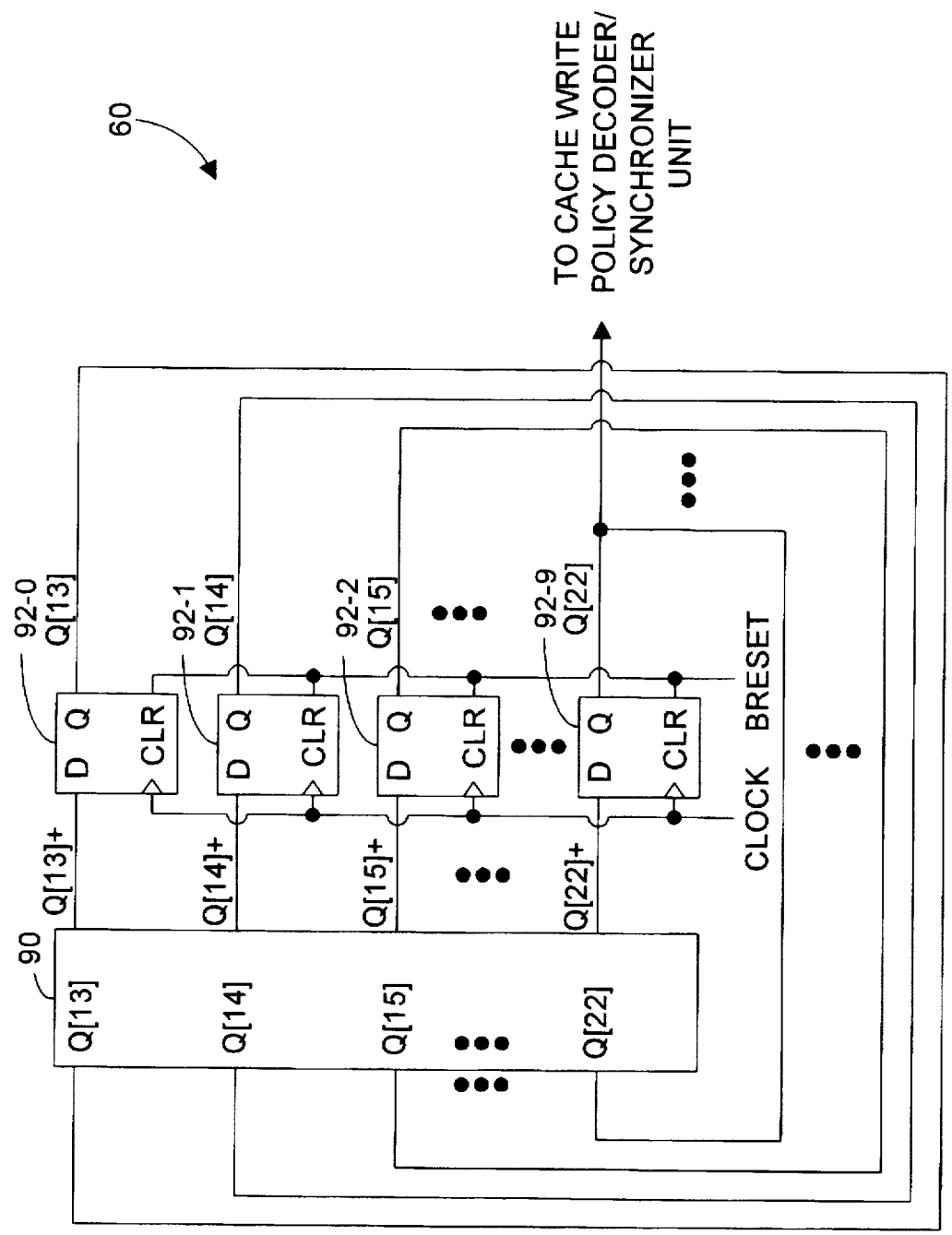
FIG. 10 is a block diagram of a cache write policy counter unit of the intrusive testing unit.

FIG. 10 is a block diagram of cache write policy counter unit 60. Cache write policy counter unit 60 includes a combinational subnetwork 90 coupled to a set of D flip-flops 92-0 through 92-9, referred to collectively as D flip-flops 92. D flip-flops 92 are clocked by an input signal CLOCK and cleared by an input signal BRESET generated by system hardware on motherboard 48. Combinational logic within combinational subnetwork 90 generates flip-flop next state (Q+) output values coupled to input terminals of D flip-flops 92 according to the following equations:

$$Q[13]+=Q[13]\oplus 1$$

$$Q[14]+=Q[14]\oplus Q[13]$$

$$Q[15]+=Q[15]\oplus (Q[13] \cdot Q[14])$$

$$Q[16]+=Q[16]\oplus (Q[13] \cdot Q[14] \cdot Q[15])$$

$$Q[17]+=Q[17]\oplus (Q[13] \cdot Q[14] \cdot Q[15] \cdot Q[16])$$

$$Q[18]+=Q[18]\oplus (Q[13] \cdot Q[14] \cdot Q[15] \cdot Q[16] \cdot Q[17])$$

$$Q[19]+=Q[19]\oplus (Q[13] \cdot Q[14] \cdot Q[15] \cdot Q[16] \cdot Q[17] \cdot Q[18])$$

$$Q[20]+=Q[20]\oplus (Q[13] \cdot Q[14] \cdot Q[15] \cdot Q[16] \cdot Q[17] \cdot Q[18] \cdot Q[19])$$

$$Q[21]+=Q[21]\oplus (Q[13] \cdot Q[14] \cdot Q[15] \cdot Q[16] \cdot Q[17] \cdot Q[18] \cdot Q[19] \cdot Q[20])$$

$$Q[22]+=Q[22]\oplus (Q[13] \cdot Q[14] \cdot Q[15] \cdot Q[16] \cdot Q[17] \cdot Q[18] \cdot Q[19] \cdot Q[20] \cdot Q[21])$$

D flip-flops 92 reproduce the logic values at input terminals (D) at output terminals (Q) at the rising edge of clock signal CLOCK. The outputs of D flip flops 92 are cleared (i.e., set to logic value 0) in response to an asserted BRESET signal. Cache write policy counter unit 60 thus implements an 10-bit binary up counter. With D flip-flops 92 serving as memory elements and output signals generated by D flip-flops 92, cache write policy counter unit 60 is a Moore sequential network. Cache write policy counter unit 60 output signal Q[22] is coupled to an input terminal of cache write policy decoder/synchronizer unit 62.

Figure 11:
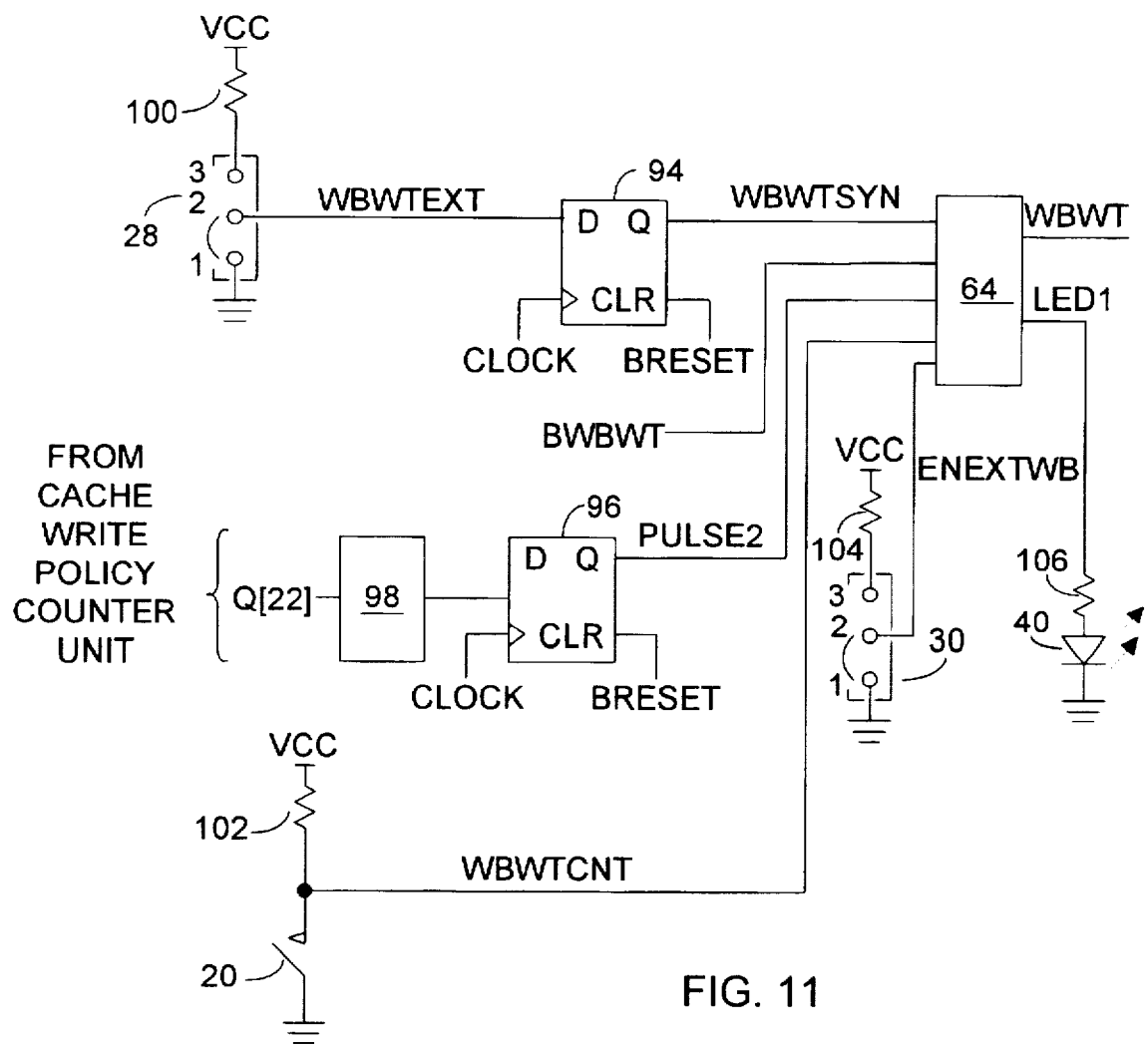
FIG. 11 is a block diagram of elements of a cache write policy decoder/synchronizer unit coupled to a cache write policy source select unit.

FIG. 11 is a block diagram of elements of cache write policy decoder/synchronizer unit 62 coupled to cache write policy source select unit 64. Elements of cache write policy decoder/synchronizer unit 62 include a first D flip-flop 94, a second D flip-flop 96, and a combinational subnetwork 98.

Figure 12:
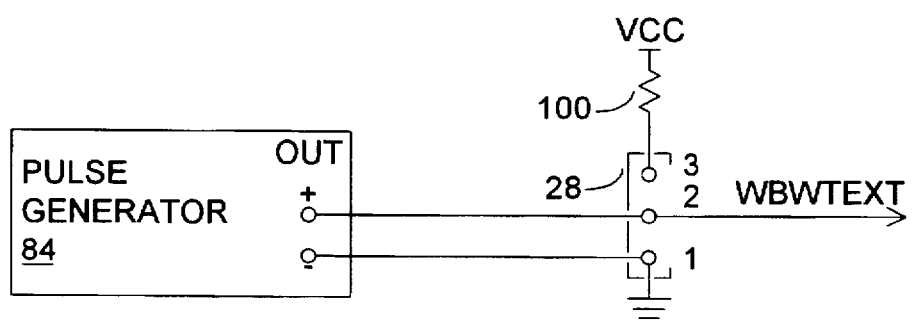
FIG. 12 is a block diagram of the output of an external pulse generator coupled to terminals of a jumper in order to generate a signal WBWTEXT.

Second jumper 28 provides for an External WB/WT# (WBWTEXT) signal. Signal WBWTEXT originates from a second terminal of second jumper 28 and is applied to an input terminal of first D flip-flop 94. A first terminal of second jumper 28 is connected to a ground potential. A third terminal of second jumper 28 is connected to a system voltage supply level $V_{CC}$ through a second jumper resistor 100. When the second terminal of second jumper 28 is connected to the first terminal as shown in FIG. 11, signal WBWTEXT is at a low voltage level (i.e., a logic 0). When the second terminal of second jumper 28 is connected to the third terminal, signal WBWTEXT is at a high voltage level (i.e., a logic 1). The output of pulse generator 84 may also be connected between terminals number 1 and number 2 of second jumper 28 as shown in FIG. 12. In this case external pulse generator 84 generates signal WBWTEXT.

First D flip-flop 94 synchronizes input signal WBWTEXT to the system clock signal CLOCK, producing a signal WBWTSYN at an output terminal. First D flip-flop 94 reproduces the logic value at input terminals (D) at output terminals (Q) at the rising edge of clock signal CLOCK. The output of first D flip-flop 94 is cleared (i.e., set to logic value 0) in response to an asserted BRESET signal.

Combinational subnetwork 98 has an input terminal coupled to signal Q[22] produced by cache write policy counter unit 60. Combinational subnetwork 98 produces a single output signal with a logic value equal to Q[22]'. The output of combinational subnetwork 98 is coupled to an input terminal of second D flip-flop 96. Second D flip-flop 96 produces a signal PULSE2 at an output terminal. Signal PULSE2 is thus the output of combinational subnetwork 98 synchronized with the system clock signal CLOCK.

Cache write policy source select unit 64 has five input terminals and two output terminals. Cache write policy source select unit 64 receives input signals WBWTSYN and PULSE2 from cache write policy decoder/synchronizer unit 62, a WB/WT# signal (BWBWT) from motherboard 48, a Hold WB/WT# Counter signal (WBWTCNT) from second switch 20, and an Enable External WB/WT# signal (ENEXTWB) from third jumper 30.

Signal WBWTCNT originates from a first terminal of second switch 20 connected to the system voltage supply level $V_{CC}$ through a second switch resistor 102. A second terminal of second switch 20 is connected to a ground potential. When second switch 20 is open as shown in FIG. 11, the first terminal of second switch 20 and signal WBWTCNT are at a high voltage level (i.e., a logic 1). When second switch 20 is closed, the first terminal of second switch 20 and signal WBWTCNT are at a low voltage level (i.e., a logic 0).

Third jumper 30 generates signal ENEXTWB which originates from a second terminal of third jumper 30. A first terminal of third jumper 30 is connected to a ground potential. A third terminal of third jumper 30 is connected to a system voltage supply level $V_{CC}$ through a third jumper resistor 104. When the second terminal of third jumper 30 is connected to the first terminal as shown in FIG. 11, signal ENEXTWB is at a low voltage level (i.e., a logic 0). When the second terminal of third jumper 30 is connected to the third terminal, signal ENEXTWB is at a high voltage level (i.e., a logic 1).

Cache write policy source select unit 64 generates output signal WBWT at one output terminal according to the following logic equation:

```
WBWT = ((BWBWT · WBWTSYN' · ENEXTWB' · PULSE2 · WBWTCNT')
     + ((BWBWT · WBWTSYN · ENEXTWB' · PULSE2 · WBWTCNT')
     + ((BWBWT · WBWTSYN · ENEXTWB · PULSE2' · WBWTCNT)
     + ((BWBWT · WBWTSYN · ENEXTWB · PULSE2 · WBWTCNT)
     + ((BWBWT · WBWTSYN' · ENEXTWB' · PULSE2' · WBWTCNT)
     + ((BWBWT · WBWTSYN' · ENEXTWB' · PULSE2 · WBWTCNT')
     + ((BWBWT · WBWTSYN' · ENEXTWB · PULSE2 · WBWTCNT)
     + ((BWBWT · WBWTSYN' · ENEXTWB · PULSE2' · WBWTCNT)
     + ((BWBWT · WBWTSYN · ENEXTWB · PULSE2 · WBWTCNT)
     + ((BWBWT · WBWTSYN · ENEXTWB' · PULSE2' · WBWTCNT)
     + ((BWBWT · WBWTSYN · ENEXTWB' · PULSE2' · WBWTCNT')
     + ((BWBWT · WBWTSYN · ENEXTWB' · PULSE2 · WBWTCNT))
```

Output signal WBWT is coupled to the WB/WT# signal pin of microprocessor 44 seated in daughterboard microprocessor socket 16 of daughterboard 10. When signal WBWTSYN is enabled (signal ENEXTWB is a logic 1) and signal WBWTSYN is a logic 1, output signal WBWT is the logical inverse of input signal BWBWT from motherboard 48. When signal PULSE2 is enabled (signal WBWTCNT is a logic 0) and signal PULSE2 is a logic 1, output signal WBWT is the logical inverse of input signal BWBWT from motherboard 48. If, however, signals WBWTSYN and PULSE2 are enabled simultaneously (signal ENEXTWB is a logic 1 and signal WBWTCNT is a logic 0), output signal WBWT is always a logic 0. In all other cases, output signal WBWT is equal to the logical value of input signal BWBWT from motherboard 48.

Signal WBWT generated from the output of cache write policy source select unit 64 cycles between a high voltage level and a low voltage level. Since PULSE2 is asserted for one-half of the $2^{10}$ (1,024) different output states of cache write policy counter unit 60, signal WBWT is a high voltage level half of the period of each cycle (i.e., has a duty cycle of about 50.0 percent). A synchronized output signal from an external pulse generator 84 may also be used to generate output signal WBWT.

Cache write policy source select unit 64 also generates an output signal LED1:

LED1=WBWTCNT'

Signal LED1 is thus a high voltage level when second switch 20 is closed, enabling a WBWT signal to be generated by cache write policy source select unit 64 from outputs of cache write policy counter unit 60. When LED1 is a high voltage level, current flows through second LED resistor 106 and second LED 40, and second LED 40 is illuminated.

Figure 13:
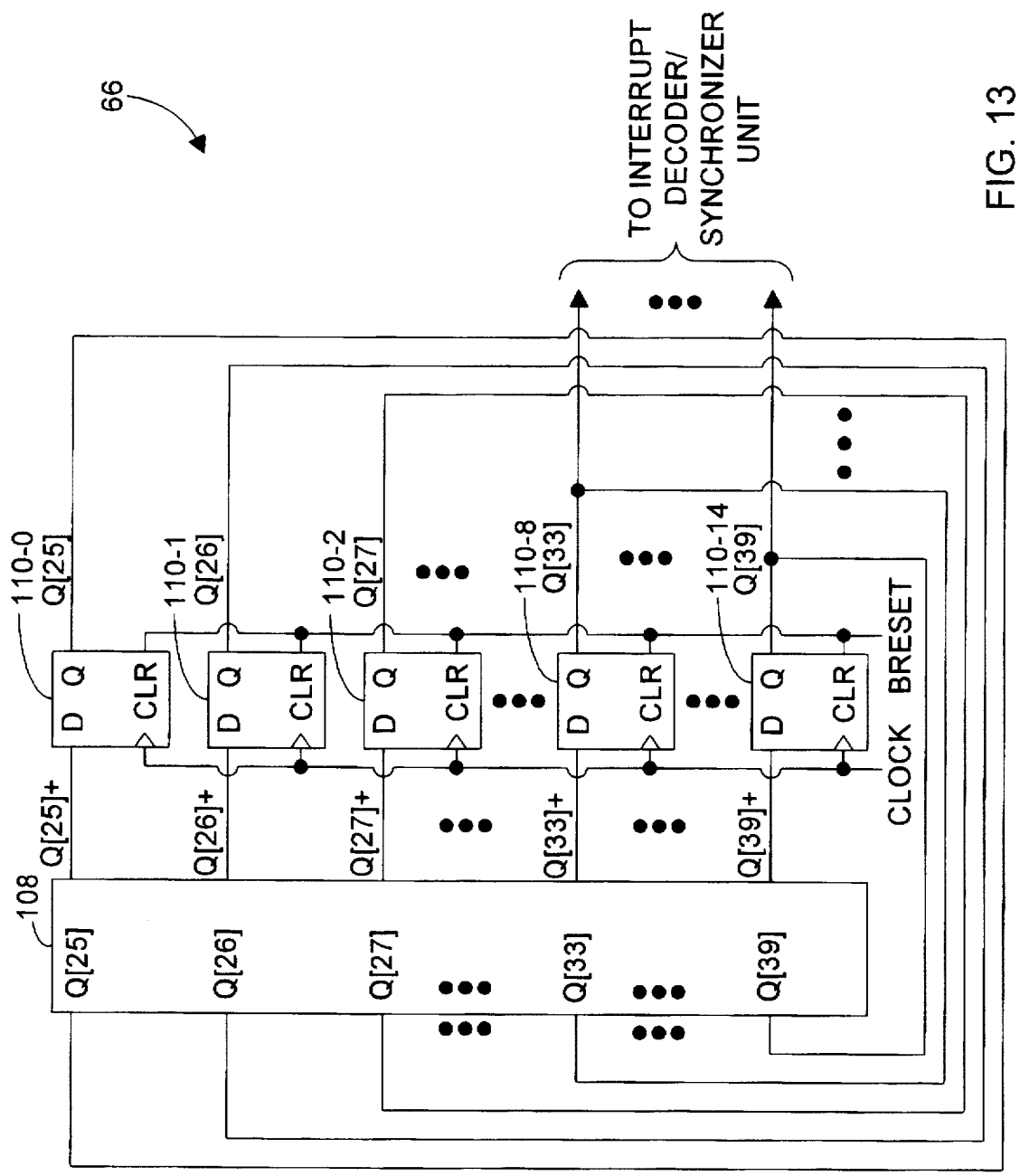
FIG. 13 is a block diagram of an interrupt counter unit of the intrusive testing unit.

FIG. 13 is a block diagram of interrupt counter unit 66. Interrupt counter unit 66 includes a combinational subnetwork 108 coupled to a set of D flip-flops 110-0 through 110-14, referred to collectively as D flip-flops 110. D flip-flops 110 are clocked by an input signal CLOCK and cleared by an input signal BRESET generated by system hardware on motherboard 48. Combinational logic within combinational subnetwork 108 generates flip-flop next state (Q+) output values coupled to input terminals of D flip-flops 110 according to the following equations:

$Q[25]+=Q[25]\oplus 1$ $Q[26]+=Q[26]\oplus Q[25]$ $Q[27]+=Q[27]\oplus (Q[25]\cdot Q[26])$ $Q[28]+=Q[28]\oplus (Q[25]\cdot Q[26]\cdot Q[27])$ $Q[29]+=Q[29]\oplus (Q[25]\cdot Q[26]\cdot Q[27]\cdot Q[28])$ $Q[30]+=Q[30]\oplus (Q[25]\cdot Q[26]\cdot Q[27]\cdot Q[28]\cdot Q[29])$ $Q[31]+=Q[31]\oplus (Q[25]\cdot Q[26]\cdot Q[27]\cdot Q[28]\cdot Q[29]\cdot Q[30])$ $Q[32]+=Q[32]\oplus (Q[25]\cdot Q[26]\cdot Q[27]\cdot Q[28]\cdot Q[29]\cdot Q[30]\cdot Q[31])$ $Q[33]+=Q[33]\oplus (Q[25]\cdot Q[26]\cdot Q[27]\cdot Q[28]\cdot Q[29]\cdot Q[30]\cdot Q[31]\cdot Q[32])$ $Q[34]+=Q[34]\oplus (Q[25]\cdot Q[26]\cdot Q[27]\cdot Q[28]\cdot Q[29]\cdot Q[30]\cdot Q[31]\cdot Q[32]\cdot Q[33])$ $Q[35]+=Q[35]\oplus (Q[25]\cdot Q[26]\cdot Q[27]\cdot Q[28]\cdot Q[29]\cdot Q[30]\cdot Q[31]\cdot Q[32]\cdot Q[33]\cdot Q[34])$ $Q[36]+=Q[36]\oplus (Q[25]\cdot Q[26]\cdot Q[27]\cdot Q[28]\cdot Q[29]\cdot Q[30]\cdot Q[31]\cdot Q[32]\cdot Q[33]\cdot Q[34]\cdot Q[35])$ $Q[37]+=Q[37]\oplus (Q[25]\cdot Q[26]\cdot Q[27]\cdot Q[28]\cdot Q[29]\cdot Q[30]\cdot Q[31]\cdot Q[32]\cdot Q[33]\cdot Q[34]\cdot Q[35]\cdot Q[36])$ $Q[38]+=Q[38]\oplus (Q[25]\cdot Q[26]\cdot Q[27]\cdot Q[28]\cdot Q[29]\cdot Q[30]\cdot Q[31]\cdot Q[32]\cdot Q[33]\cdot Q[34]\cdot Q[35]\cdot Q[36]\cdot Q[37])$ $Q[39]+=Q[39]\oplus (Q[25]\cdot Q[26]\cdot Q[27]\cdot Q[28]\cdot Q[29]\cdot Q[30]\cdot Q[31]\cdot Q[32]\cdot Q[33]\cdot Q[34]\cdot Q[35]\cdot Q[36]\cdot Q[37]\cdot Q[38])$ D flip-flops 110 reproduce the logic values at input terminals (D) at output terminals (Q) at the rising edge of clock signal CLOCK. The outputs of D flip flops 110 are cleared (i.e., set to logic value 0) in response to an asserted BRESET signal. Interrupt counter unit 66 thus implements an 15-bit binary up counter. With D flip-flops 110 serving as memory elements and output signals generated by D flip-flops 110, interrupt counter unit 66 is a Moore sequential network. Interrupt counter unit 66 output signals Q[33], Q[34], Q[35], Q[36], Q[37], Q[38], and Q[39] are coupled to input terminals of interrupt decoder/synchronizer unit 68.

Figure 14:
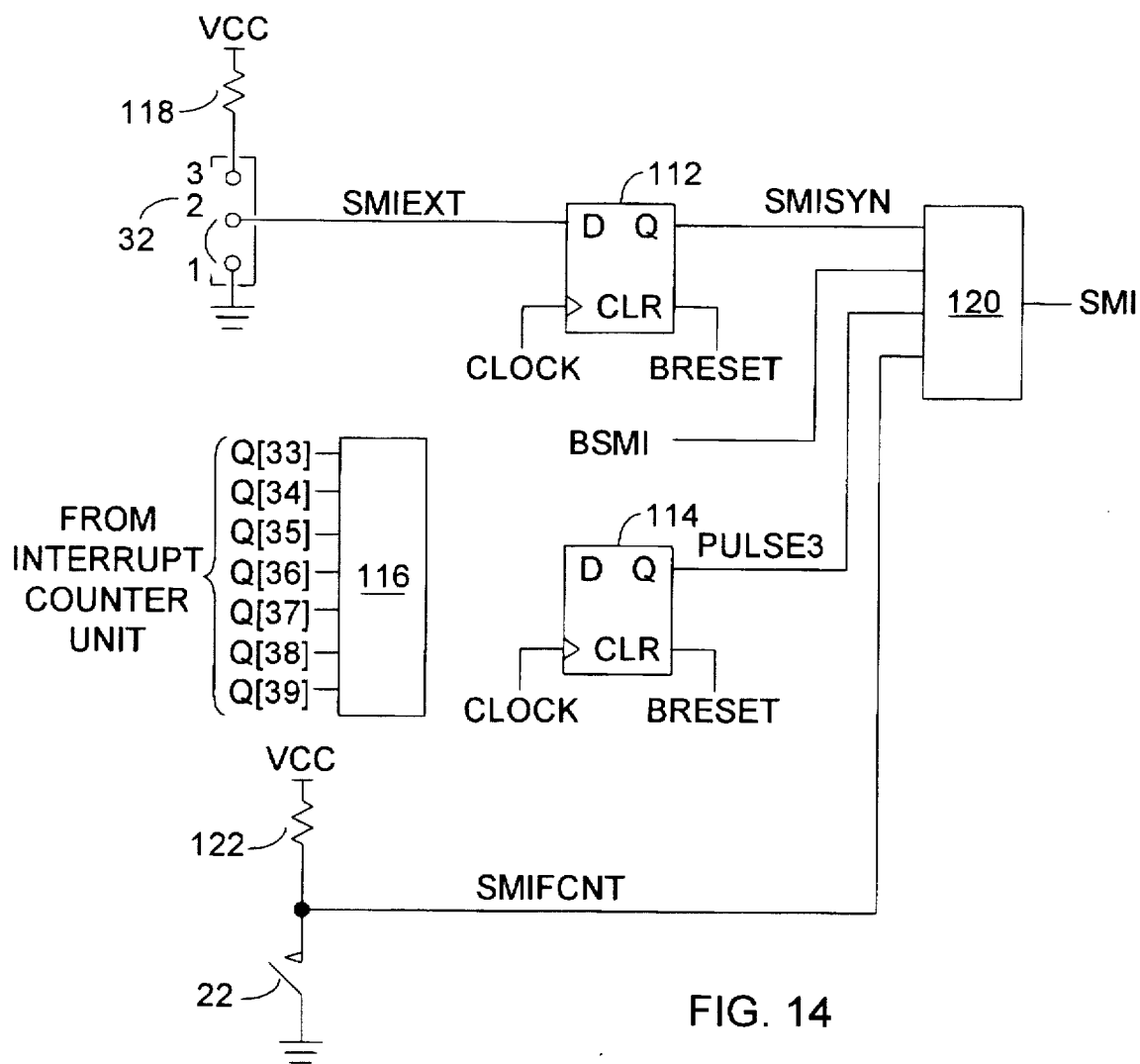
FIG. 14 is a block diagram of elements of the interrupt decoder/synchronizer unit coupled to an element of the interrupt source select unit.

FIG. 14 is a block diagram of elements of interrupt decoder/synchronizer unit 68 coupled to a first combinational subnetwork 120 of interrupt source select unit 70. Elements of interrupt decoder/synchronizer unit 68 include a first D flip-flop 112, a second D flip-flop 114, and a combinational subnetwork 116.

Figure 15:
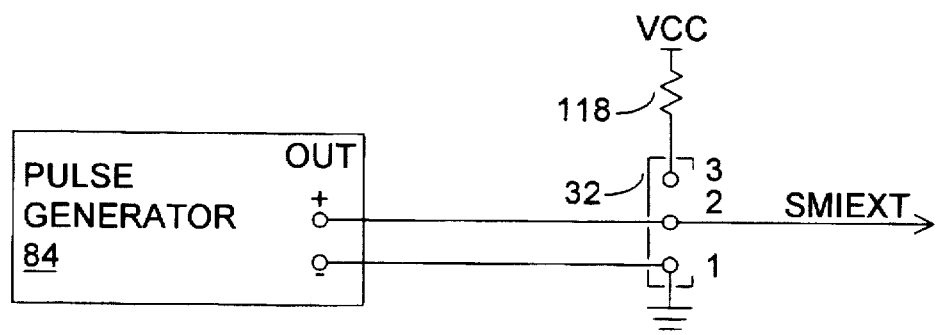
FIG. 15 is a block diagram of the output of an external pulse generator coupled to terminals of a jumper in order to generate a signal SMIEXT.

Fourth jumper 32 provides for an External SMI# (SMIEXT) signal. Signal SMIEXT originates from a second terminal of fourth jumper 32 and is applied to an input terminal of first D flip-flop 112. A first terminal of fourth jumper 32 is connected to a ground potential. A third terminal of fourth jumper 32 is connected to a system voltage supply level $V_{CC}$ through a fourth jumper resistor 118. When the second terminal of fourth jumper 32 is connected to the first terminal as shown in FIG. 14, signal SMIEXT is at a low voltage level (i.e., a logic 0). When the second terminal of fourth jumper 32 is connected to the third terminal, signal SMIEXT is at a high voltage level (i.e., a logic 1). The output of pulse generator 84 may also be connected between the first and second terminals of fourth jumper 32 as shown in FIG. 15. In this case external pulse generator 84 generates signal SMIEXT.

First D flip-flop 112 synchronizes input signal SMIEXT to the system clock signal CLOCK, producing a signal SMI-SYN at an output terminal. First D flip-flop 112 reproduces the logic value at input terminals (D) at output terminals (Q) at the rising edge of clock signal CLOCK. The output of first D flip-flop 112 is cleared (i.e., set to logic value 0) in response to an asserted BRESET signal.

Combinational subnetwork 116 has input terminals coupled to signals Q[33], Q[34], Q[35], Q[36], Q[37], Q[38], and Q[39] produced by interrupt counter unit 66. Combinational subnetwork 116 produces a single output signal with a logic value equal to:

Q[33]'•Q[34]'•Q[35]'•Q[36]'•Q[37]'•Q[38]'•Q[39]'

The output of combinational subnetwork 116 is coupled to an input terminal of second D flip-flop 114. Second D flip-flop 114 produces a signal PULSE3 at an output terminal. Signal PULSE3 is thus the output of combinational subnetwork 114 synchronized with the system clock signal CLOCK.

First combinational subnetwork 120 of interrupt source select unit 70 has four input terminals and one output terminal. First combinational subnetwork 120 receives input signals SMISYN and PULSE3 from interrupt decoder/synchronizer unit 68, an SMI# signal (BSMI) from motherboard 48, and a signal Hold SMI# Counter (SMIFCNT) from third switch 22.

Signal SMIFCNT originates from a first terminal of third switch 22 connected to the system voltage supply level $V_{CC}$ through a third switch resistor 122. A second terminal of third switch 22 is connected to a ground potential. When third switch 22 is open as shown in FIG. 11, the first terminal of third switch 22 and signal SMIFCNT are at a high voltage level (i.e., a logic 1). When third switch 22 is closed, the first terminal of third switch 22 and signal SMIFCNT are at a low voltage level (i.e., a logic 0).

First combinational subnetwork 120 of interrupt source select unit 70 generates an output signal SMI at an output terminal according to the following logic equation:

*SMI=SMISYN'•BSMI•(PULSE3•SMIFCNT)'*

Output signal SMI is coupled to the SMI# signal pin of microprocessor 44 seated in daughterboard microprocessor socket 16 of daughterboard 10. Output signal SMI is asserted (i.e., a logic 0) when (i) signal BSMI from motherboard 48 is a logic 0, (ii) signal SMISYN from interrupt decoder/synchronizer unit 68 (generated from external pulse generator 84) is a logic 1, or (iii) third switch 22 is closed (signal SMIFCNT is a logic 0) and signal PULSE3 from interrupt decoder/synchronizer unit 68 (generated from the output of interrupt counter unit 66) is logic 1.

Signal PULSE3 from interrupt decoder/synchronizer unit 68 cycles between a high voltage level and a low voltage level. Since PULSE3 is a logic 1 for 256 ($2^8$) of the 32,768 ($2^{15}$) different output states of interrupt counter unit 66, signal SMI generated from PULSE3 is at a low voltage level (i.e., asserted) 0.78 percent of the time.

Figure 16:
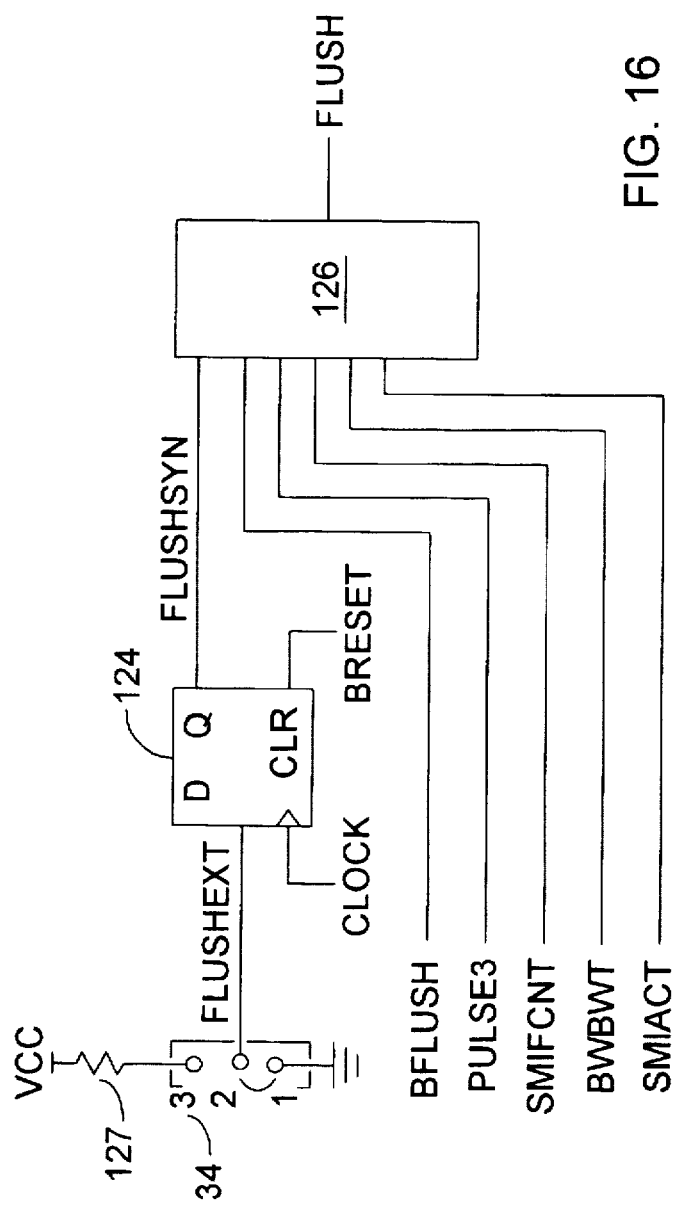
FIG. 16 is a block diagram of an element of the interrupt decoder/synchronizer unit coupled to an element of the interrupt source select unit.
Figure 17:
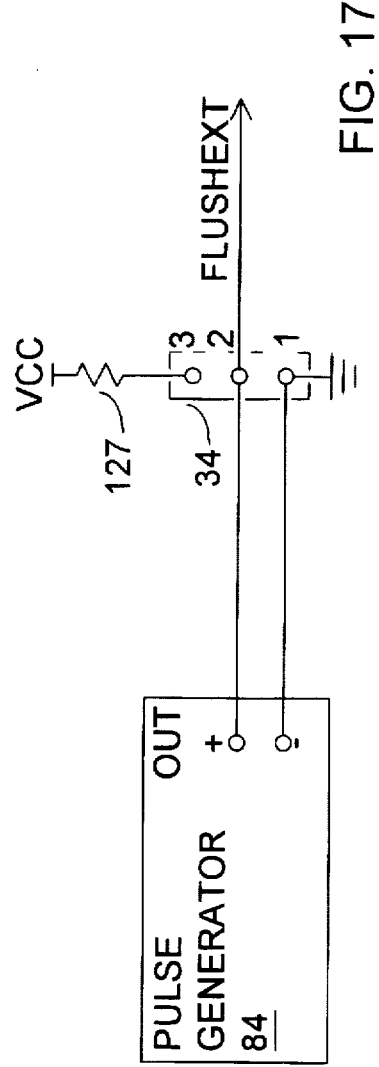
FIG. 17 is a block diagram of the output of an external pulse generator coupled to terminals of a jumper in order to generate a signal FLUSHEXT.

FIG. 16 is a block diagram of a third D flip-flop 124 of interrupt decoder/synchronizer unit 68 coupled to an a second combinational subnetwork 126 of interrupt source select unit 70. Fifth jumper 34 provides for an External FLUSH# (FLUSHEXT) signal. Signal FLUSHEXT originates from a second terminal of fifth jumper 34 and is applied to an input terminal of third D flip-flop 124. A first terminal of fifth jumper 34 is connected to a ground potential. A third terminal of fifth jumper 34 is connected to a system voltage supply level $V_{CC}$ through a fifth jumper resistor 127. When the second terminal of fifth jumper 34 is connected to the first terminal as shown in FIG. 16, signal FLUSHEXT is at a low voltage level (i.e., a logic 0). When the second terminal of fifth jumper 34 is connected to the third terminal, signal FLUSHEXT is at a high voltage level (i.e., a logic 1). The output of pulse generator 84 may also be connected between the first and second terminals of fifth jumper 34 as shown in FIG. 17. In this case external pulse generator 84 generates signal FLUSHEXT.

Third D flip-flop 124 of interrupt decoder/synchronizer unit 68 synchronizes input signal FLUSHEXT to the system clock signal CLOCK, producing a signal FLUSHSYN at an output terminal. Third D flip-flop 124 reproduces the logic value at input terminals (D) at output terminals (Q) at the rising edge of clock signal CLOCK. The output of third D flip-flop 124 is cleared (i.e., set to logic value 0) in response to an asserted BRESET signal.

Second combinational subnetwork 126 of interrupt source select unit 70 has six input terminals and one output terminal. Signal FLUSHSYN at the output terminal of third D flip-flop 124 is coupled to one input terminal of second combinational subnetwork 126. Three signals from motherboard 48 are also coupled to input terminals of second combinational subnetwork 126: BFLUSH, BWBWT, and SMIACT. Signal PULSE3 generated by second D flip-flop 114 of interrupt decoder/synchronizer unit 68 is also coupled to an input terminal of second combinational subnetwork 126, along with signal SMIFCNT generated by third switch 22.

Second combinational subnetwork 126 of interrupt source select unit 70 generates an output signal FLUSH at an output terminal according to the following logic equation:

FLUSH=FLUSHSYN'•BFLUSH•(PULSE3•SMIFCNT•BWBWT)'•
(PULSE3•SMIFCNT•SMIACT•BWBWT)'

Output signal FLUSH is coupled to the FLUSH# signal pin of microprocessor 44 seated in daughterboard microprocessor socket 16 of daughterboard 10. Output signal FLUSH is asserted (i.e., a logic 0) when signal BFLUSH from motherboard 48 is a logic 0, or signal FLUSHSYN from interrupt decoder/synchronizer unit 68 (generated from external pulse generator 84) is a logic 1.

Output signal FLUSH is also asserted when third switch 22 is closed (signal SMIFCNT is a logic 0), signal PULSE3 from interrupt decoder/synchronizer unit 68 (generated from the output of interrupt counter unit 66) is a logic 1, and the internal cache is operating in the write-back mode (signal BWBWT from motherboard 48 is a logic 1). This is a requirement for Enhanced 486 processors with memory subsystems which overlay system management random access memory (SMRAM). Signal PULSE3 also generates an SMI# interrupt request to enter SMM. If the internal cache is not flushed upon entry into SMM, the first SMM read operation may access a cache entry containing normal memory space code or data instead of SMM handler information.

Output signal FLUSH is also asserted when third switch 22 is closed (signal SMIFCNT is a logic 0), signal PULSE3 from interrupt decoder/synchronizer unit 68 (generated from the output of interrupt counter unit 66) is a logic 1, the internal cache is operating in the write-through mode (signal BWBWT from motherboard 48 is a logic 0), and microprocessor 44 is operating in SMM (signal SMIACT# is a logic 0). This invalidation of cache contents upon entry into SMM is sufficient for Enhanced 486 processors with memory subsystems which overlay system management random access memory (SMRAM) and an internal cache operating in the write-through mode.

Figures 18, 19:
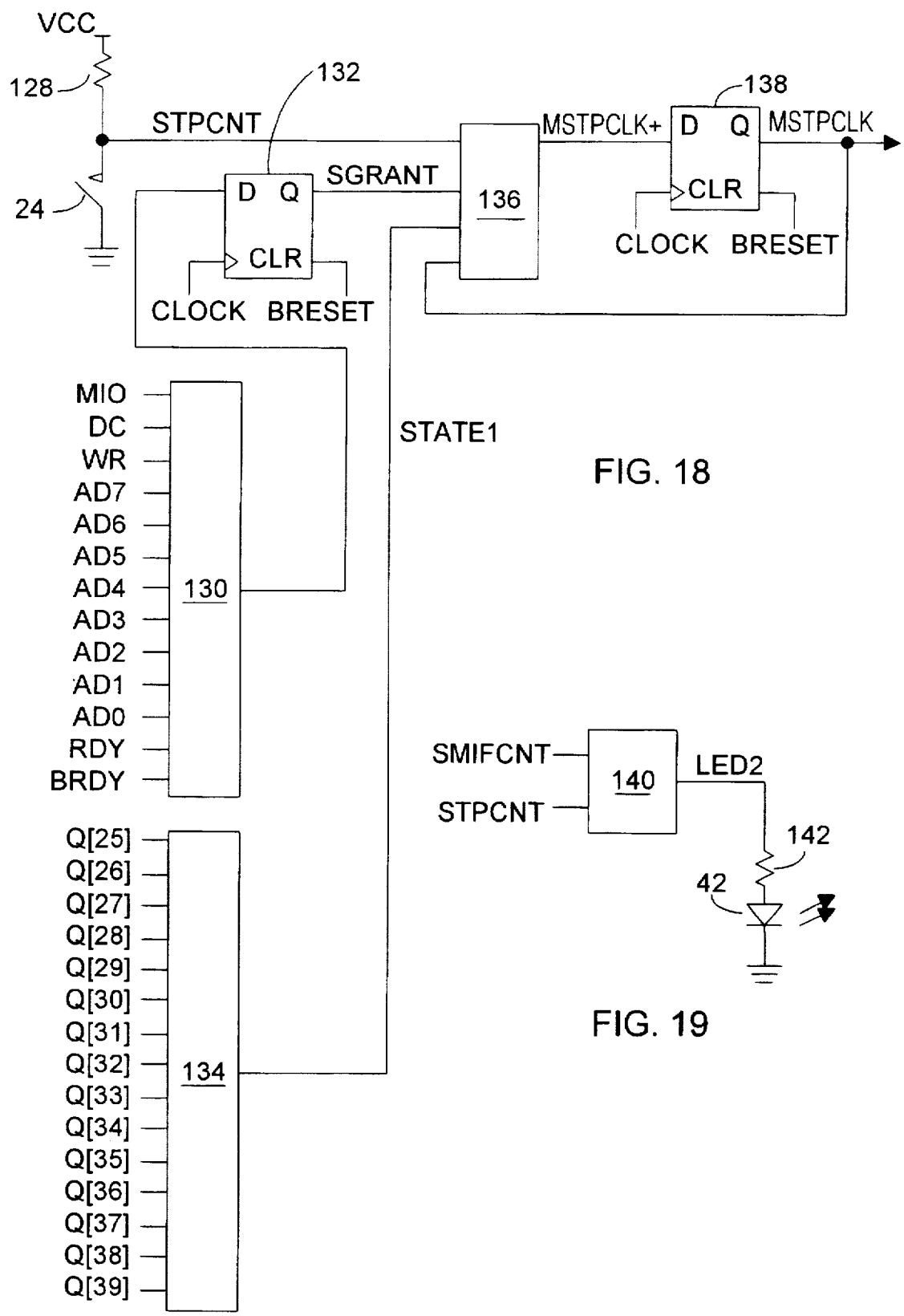
FIG. 18 is a block diagram of a portion of the interrupt decoder/synchronizer unit used to generate signal MSTPCLK.
FIG. 19 is a block diagram of the generation of an output signal LED2 by an element of the interrupt source select unit.

FIG. 18 is a block diagram of a portion of interrupt decoder/synchronizer unit 68 used to generate signal MACH Stop Clock (MSTPCLK), an input signal to interrupt source select unit 70. Signal Stop Clock Counter Enable (STPCNT) originates from a first terminal of fourth switch 24 connected to the system voltage supply level $V_{CC}$ through a fourth switch resistor 128. A second terminal of fourth switch 24 is connected to a ground potential. When fourth switch 24 is open as shown in FIG. 18, the first terminal of fourth switch 24 and signal STPCNT are at a high voltage level (i.e., a logic 1). When fourth switch 24 is closed, the first terminal of fourth switch 24 and signal STPCNT are at a low voltage level (i.e., a logic 0).

A second combinational subnetwork 130 of interrupt decoder/synchronizer 68 has 13 inputs coupled to signals from motherboard 48: MIO (to M/IO#), DC (to D/C#), WR (to W/R#), AD7, AD6, AD5, AD4, AD3, AD2, AD1, AD0, RDY (to RDY#), and BRDY (to BRDY#). Second combinational subnetwork 130 generates an output signal at an output terminal according to the following equation:

$$MIO \cdot DC \cdot WR \cdot AD7 \cdot AD6 \cdot AD5 \cdot AD4 \cdot AD3 \cdot AD2 \cdot AD1 \cdot AD0 \cdot (RDY \cdot BRDY)'$$

Thus the output of second combinational subnetwork 130 is a logic 1 when microprocessor 44 enters the Stop Grant state. Second combinational subnetwork 130 signals entry into the Stop Grant state by detecting (i) the special Stop Grant bus cycle issued by microprocessor 44 after recognizing the STPCLK# interrupt, and (ii) the subsequent acknowledgement by system hardware on motherboard 48:

Stop Grant Bus Cycle:
MIO=0, DC=0, WR=1, Address=0000 0010h
System Hardware Acknowledgement:
RDY=0 or BRDY=0

The output of second combinational subnetwork 130 is coupled to an input terminal of fourth D flip-flop 132 of interrupt decoder/synchronizer unit 68. Fourth D flip-flop 132 synchronizes the input signal from second combinational subnetwork 130 with the system clock signal CLOCK, producing a signal SGRANT at an output terminal. Fourth D flip-flop 132 reproduces the logic value at input terminal (D) at output terminal (Q) at the rising edge of clock signal CLOCK. The output of fourth D flip-flop 132 is cleared (i.e., set to logic value 0) in response to an asserted BRESET signal.

A third combinational subnetwork 134 of interrupt decoder/synchronizer unit 68 has input terminals coupled to signals Q[25]–Q[39] produced by interrupt counter unit 66. Third combinational subnetwork 134 produces a single output signal STATE1 with a logic value given by:

$$STATE1=Q[25]' \cdot Q[26]' \cdot Q[27]' \cdot Q[28]' \cdot Q[29]' \cdot Q[30]' \cdot Q[31]' \cdot Q[32]' \cdot Q[33]' \cdot Q[34]' \cdot Q[35]' \cdot Q[36]' \cdot Q[37]' \cdot Q[38]' \cdot Q[39]'$$

Signal STATE1 is coupled to an input terminal of a fourth combinational network 136 of interrupt decoder/synchronizer unit 68. Fourth combinational network 136 is coupled to a fifth D flip-flop 138 of interrupt decoder/synchronizer unit 68, forming a Moore sequential network. Fourth combinational network 136 has input terminals coupled to signals STPCNT (generated by fourth switch 24), SGRANT, STATE1, and an output signal MSTPCLK generated at an output terminal of fifth D flip-flop 138. Fourth combinational network 136 generates an output signal MSTPCLK+ (i.e., the next value of a signal MSTPCLK) at an output terminal according to the following logic equation:

$$MSTPCLK+=(STPCNT \cdot STATE1 \cdot MSTPCLK') + (STPCNT \cdot SGRANT \cdot MSTPCLK)$$

Signal MSTPCLK+ is enabled when fourth switch 24 is closed (signal STPCNT is a logic 0), and is asserted when (i) signal STATE1 (generated from the outputs of interrupt counter unit 66) is a logic 1 and signal MSTPCLK is not asserted, or (ii) signal MSTPCLK is asserted and microprocessor 44 is not in the Stop Grant state (signal SGRANT is a logic 0). Signal STATE1 is a logic 1 for 1 of the 32,768 ($2^{15}$) different output states of interrupt counter unit 66, allowing periodic assertion of signal MSTPCLK. Fifth D flip-flop 138 synchronizes input signal MSTPCLK+ to the system clock signal CLOCK, producing a signal MSTPCLK at an output terminal.

FIG. 19 is a block diagram of the generation of an output signal LED2 by a third combinational subnetwork 140 of interrupt source select unit 70. Third combinational subnetwork 140 has input terminals coupled to signals SMIFCNT (generated by third switch 22) and STPCNT (generated by fourth switch 24), and generates output signal LED2 according to the following logic equation:

$$LED2=SMIFCNT+STPCNT$$

Signal LED2 is thus a high voltage level when third switch 22 is closed (signal SMIFCNT is a logic 0) or fourth switch 24 is closed (signal STPCNT is a logic 0). When signal LED2 is a high voltage level, current flows through third LED resistor 142 and third LED 42, and third LED 42 is illuminated.

Figure 20:
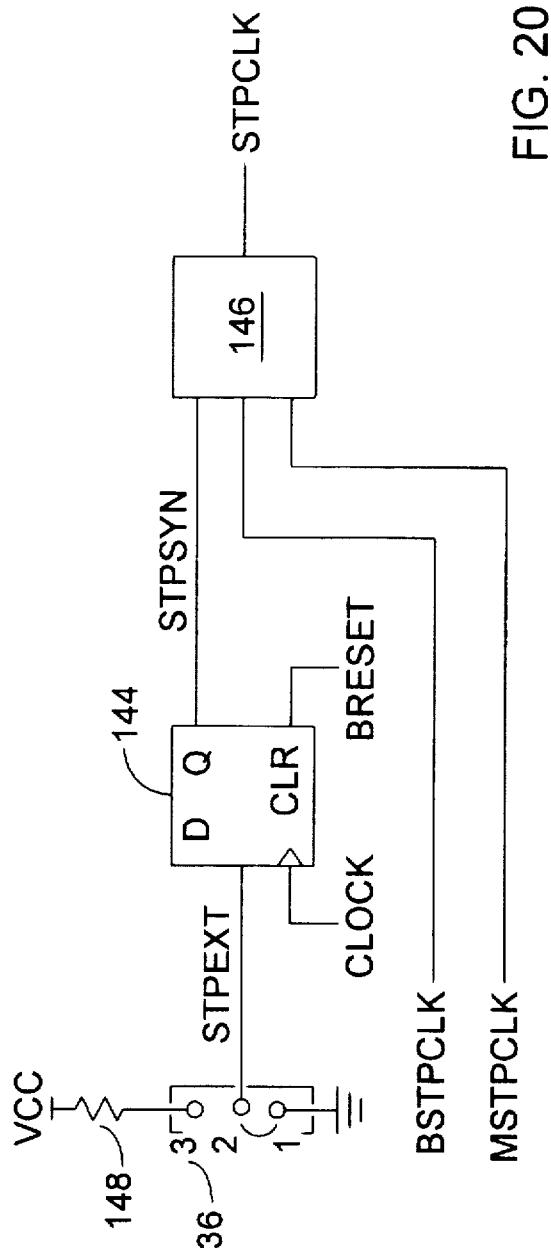
FIG. 20 is a block diagram of an element of the interrupt decoder/synchronizer unit coupled to an element of the interrupt source select unit.
Figure 21:
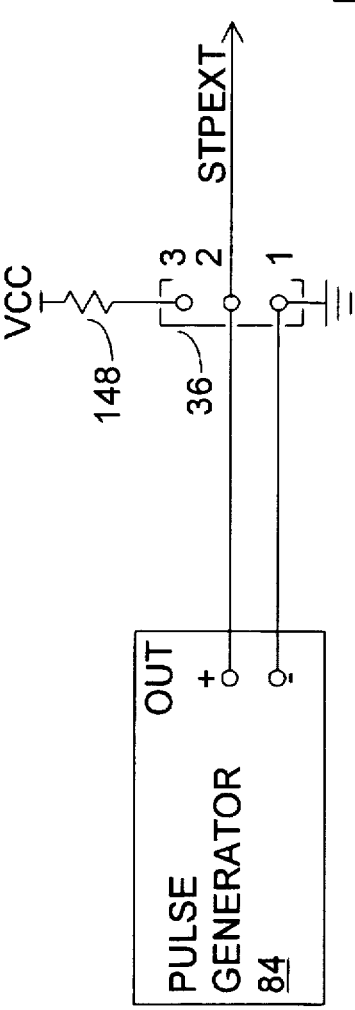
FIG. 21 is a block diagram of the output of an external pulse generator coupled to terminals of a jumper in order to generate a signal STPEXT.

FIG. 20 is a block diagram of a sixth D flip-flop 144 of interrupt decoder/synchronizer unit 68 coupled to a fourth combinational subnetwork 146 of interrupt source select unit 70. Sixth jumper 36 provides for an External STPCLK# (STPEXT) signal. Signal STPEXT originates from a second terminal of sixth jumper 36 and is applied to an input terminal of sixth D flip-flop 144. A first terminal of sixth jumper 36 is connected to a ground potential. A third terminal of sixth jumper 36 is connected to a system voltage supply level $V_{CC}$ through a sixth jumper resistor 148. When the second terminal of sixth jumper 36 is connected to the first terminal as shown in FIG. 20, signal STPEXT is at a low voltage level (i.e., a logic 0). When the second terminal of sixth jumper 36 is connected to the third terminal, signal STPEXT is at a high voltage level (i.e., a logic 1). The output of pulse generator 84 may also be connected between the first and second terminals of sixth jumper 36 as shown in FIG. 21. In this case external pulse generator 84 generates signal STPEXT.

Sixth D flip-flop 144 of interrupt decoder/synchronizer unit 68 synchronizes input signal STPEXT to the system clock signal CLOCK, producing a signal STPSYN at an output terminal. Sixth D flip-flop 144 reproduces the logic value at input terminals (D) at output terminals (Q) at the rising edge of clock signal CLOCK. The output of sixth D flip-flop 144 is cleared (i.e., set to logic value 0) in response to an asserted BRESET signal.

Fourth combinational subnetwork 146 of interrupt source select unit 70 has three input terminals and one output terminal. Signal STPSYN at the output terminal of sixth D flip-flop 144 is coupled to one input terminal of fourth combinational subnetwork 146. A STPCLK# signal (BSTPCLK) from motherboard 48 is coupled to another input terminal, as is signal MSTPCLK produced by fifth D flip-flop 138 of interrupt decoder/synchronizer unit 68.

Fourth combinational subnetwork 146 of interrupt source select unit 70 generates an output signal STPCLK at an output terminal according to the following logic equation:

$$STPCLK = STPSYN' \cdot BSTPCLK \cdot MSTPCLK'$$

Output signal STPCLK is coupled to the STPCLK# signal pin of microprocessor 44 seated in daughterboard microprocessor socket 16 of daughterboard 10. Output signal STPCLK is asserted (i.e., a logic 0) when signal BSTPCLK from motherboard 48 is a logic 0, or signal STPSYN (generated from external pulse generator 84) is a logic 1, or signal MSTPCLK (triggered by interrupt counter unit 66) is a logic 1.

Figure 22:
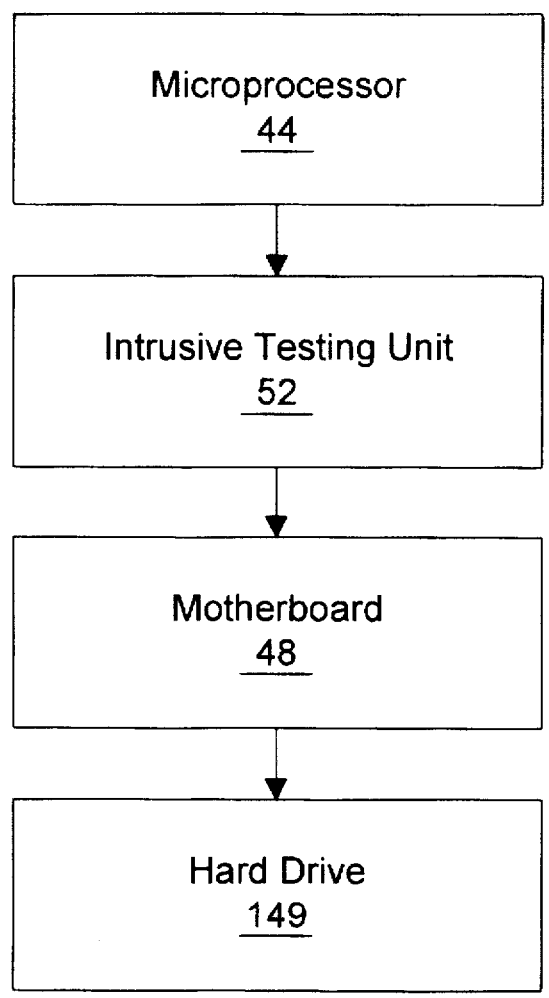
FIG. 22 is a block diagram of the hardware associated with the intrusive testing method.

The intrusive testing method of the present invention will be described using FIGS. 22 and 23. FIG. 22 is a block diagram of the hardware associated with the intrusive testing method. As described above, intrusive testing unit 52 is coupled between microprocessor 44 and computer system motherboard 48 during testing. In addition, a hard drive 149 configured to store computer files is coupled to motherboard 48. As will be described in more detail below, hard drive 149 may be connected to a local expansion bus of motherboard 48, or may be coupled to motherboard 48 via a computer network connection. For example, hard drive 149 may be connected to a local expansion bus of a network server coupled to motherboard 48 via a computer network connection.

Figure 23:
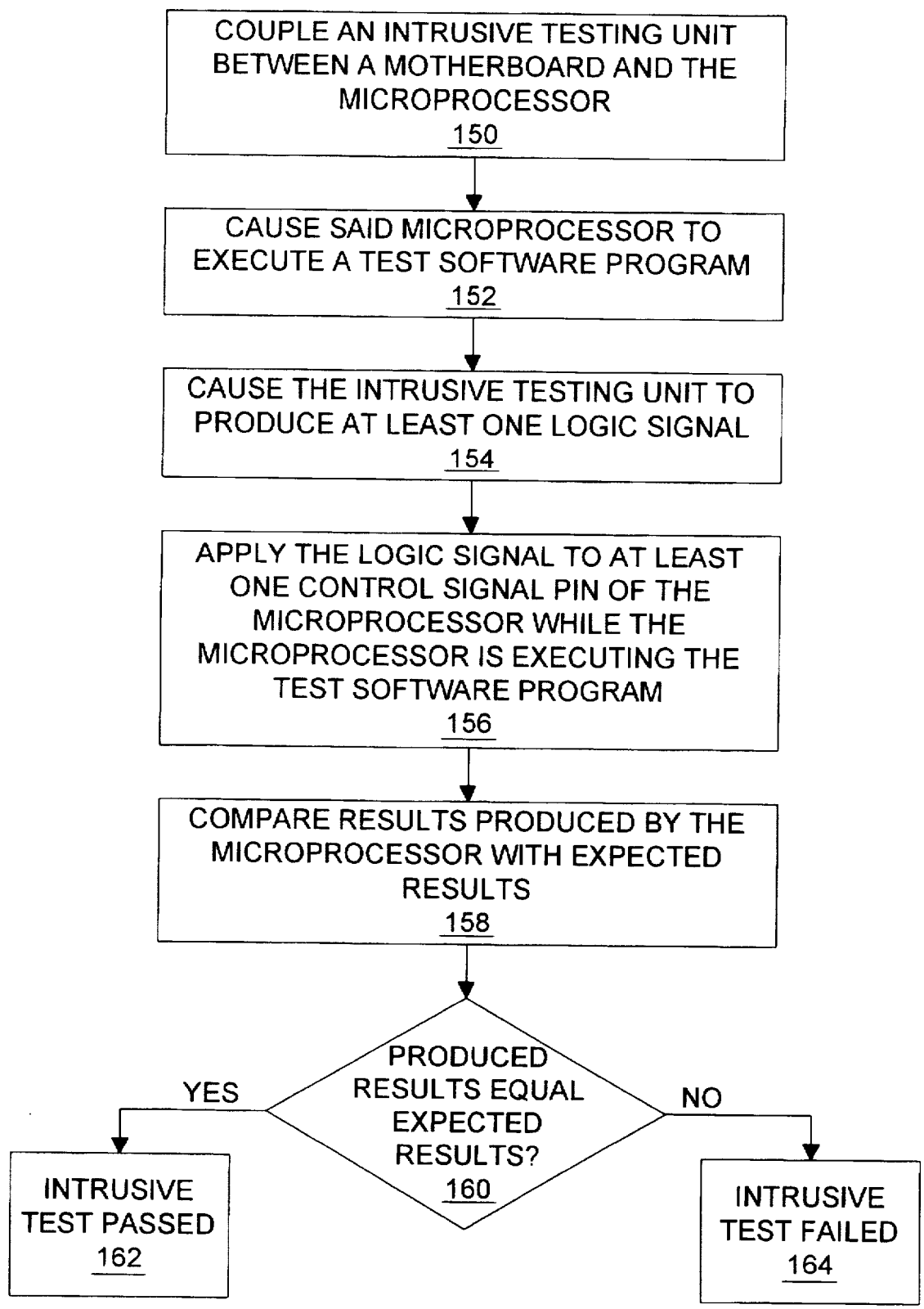
FIG. 23 is a flow chart of the intrusive testing method of the present invention.

FIG. 23 is a flow chart of the intrusive testing method of the present invention. In a first step 150, intrusive testing unit 52 is coupled between microprocessor 44 and computer system motherboard 48. In a step 152, microprocessor 44 is then caused to execute a test software program. The term "test software program" includes (i) a chosen operating system, (ii) a chosen operating environment, and (iii) a chosen applications program. Common computer operating systems for microprocessors designed to execute x86 instructions, like the Enhanced Am486™, include the well-known DOS and newer versions of Windows®, both obtainable from the Microsoft Corporation, Redmond, Wash. Microprocessor 44 is preferably tested in all anticipated operating environments, including stand-alone and as part of a computer network. Microprocessor 44 is typically coupled to a processor bus, and a bus bridge unit typically couples the processor bus to a local expansion bus of motherboard 48. In a stand-alone environment, hard drive 149 is typically connected to the local expansion bus of motherboard 48. In a computer network environment, hard drive 149 may be connected to the local expansion bus of motherboard 48, or coupled to motherboard 48 via a computer network connection as described above. Common computer network software includes Windows-NT (obtainable from Microsoft Corporation, Redmond, Wash.), OS/2 (obtainable from IBM Corporation, Armonk, N.Y.), and NetWare (obtainable from the Novell Corporation, Provo, Utah).

Applications programs executed by microprocessor 44 during testing are preferably designed to maximize processor bus mastering activity. A suitable applications program performs the following operations over and over: (i) read the contents of a large first file from hard drive 149, (ii) write the contents of the first file back to a second file on hard drive 149, (iii) compare the contents of the fist and second file, (iv) record any differences in the first and second files in a third file on hard drive 149, and (v) erase the second file from hard drive 149. Any differences noted in the contents of the first and second files, and stored in the third file, may be evidence of errors or defects in performance-enhancing features or related control circuitry which affected test program execution.

As microprocessor 44 executes the test software program, intrusive testing unit 52 is caused to generate at least one logic signal in a step 154. Logic signals generated by intrusive testing unit 52 are then applied to control signal pins of microprocessor 44 in a step 156. In a step 158, the computer system is monitored to ensure microprocessor 44 is able to make internal configuration changes while still generating correct program results. The intrusive test is evaluated in a step 160. If microprocessor 44 is able to generate correct program results while making internal configuration changes, the intrusive test is passed (a step 162). If microprocessor 44 is not able to generate correct program results, the intrusive test is failed (a step 164).

It will be appreciated to those skilled in the art having the benefit of this disclosure that this invention is believed to be a method and apparatus capable of performing intrusive testing upon a microprocessor. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A method of performing intrusive testing upon a microprocessor, comprising the steps of:

coupling an intrusive testing unit between a motherboard and said microprocessor;

causing said microprocessor to execute a test software program, wherein the test software program comprises a set of instructions to (i) read the contents of a first computer file from a hard drive coupled to the motherboard, and (ii) write the contents of the first computer file back to a second computer file on the hard drive;

causing the intrusive testing unit to produce at least one logic signal;

applying said logic signal to at least one control signal pin of the microprocessor while the microprocessor is executing the test software program; and comparing the response produced by the microprocessor with a set of desired results; and producing a test result based on the comparison of the response produced by the microprocessor and the set of desired results.

2. The method as recited in claim 1, wherein causing the intrusive testing unit to produce at least one logic signal comprises applying at least one external control signal to the intrusive testing unit.

3. The method as recited in claim 1, wherein the response produced by the microprocessor comprises the contents of the second computer file.

4. The method as recited in claim 3, wherein the set of expected results comprises the contents of the first computer file.

5. The method as recited in claim 4, wherein the producing step comprises producing a positive test result if the second computer file is an identical copy of the first computer file.

6. The method as recited in claim 4, wherein the producing step comprises producing a negative test result if the second computer file is not an identical copy of the first computer file.

7. An apparatus for performing intrusive testing upon a microprocessor, comprising:

- a bus mastering counter unit coupled to receive a clock signal from a motherboard and configured to produce a first set of counter state signals;
- a bus mastering decoder/synchronizer unit coupled to receive said first set of counter state signals and produce an alternate bus arbitration control signal; and
- a bus mastering source select unit coupled to receive a system bus arbitration control signal from the motherboard and said alternate bus arbitration control signal, wherein the bus mastering source select unit is configured to provide a bus arbitration control signal to the microprocessor.

8. The apparatus as recited in claim 7, wherein the bus mastering counter unit comprises a sequential digital circuit implementing a binary up counter.

9. The apparatus as recited in claim 7, wherein the bus arbitration control signal comprises a logical combination of the system bus arbitration control signal and the alternate bus arbitration control signal.

10. The apparatus as recited in claim 7, wherein:

the bus mastering decoder/synchronizer unit is configured to (i) receive the first set of counter state signals and produce a first alternate bus arbitration control signal in response thereto, and (ii) receive an input signal from an external pulse generator and produce a second alternate bus arbitration control signal in response thereto; and the bus mastering source select unit is coupled to receive the first and second alternate bus arbitration control signals and configured to produce the bus arbitration control signal in response thereto.

11. The apparatus as recited in claim 10, wherein the bus arbitration control signal comprises a logical combination of the system bus arbitration control signal and the first and second alternate bus arbitration control signals.

12. The apparatus as recited in claim 7, further comprising:

- a cache write policy counter unit coupled to receive said clock signal and configured to provide a second set of counter state signals;
- a cache write policy decoder/synchronizer unit coupled to receive said second set of counter state signals and configured to produce an alternate write-back cache control signal; and
- a cache write policy source select unit coupled to receive a system write-back cache control signal from the motherboard and the alternate write-back cache control signal, wherein the cache write policy source select unit is configured to provide a write-back cache control signal to the microprocessor.

13. The apparatus as recited in claim 12, wherein the cache write policy counter unit comprises a sequential digital circuit implementing a binary up counter.

14. The apparatus as recited in claim 12, wherein the write-back cache control signal comprises a logical combination of the system write-back cache control signal and the alternate write-back cache control signal.

15. The apparatus as recited in claim 12, wherein:

the cache write policy decoder/synchronizer unit is configured to (i) receive the second set of counter state signals and produce a first write-back cache control signal in response thereto, and (ii) receive an input signal from an external pulse generator and produce a second alternate write-back cache control signal in response thereto; and the cache write policy source select unit is coupled to receive the first and second alternate write-back cache control signals and configured to produce the write-back cache control signal in response thereto.

16. The apparatus as recited in claim 15, wherein the write-back cache control signal comprises a logical combination of the system write-back cache control signal and the first and second alternate write-back cache control signals.

17. The apparatus as recited in claim 7, further comprising:

- an interrupt counter unit coupled to receive said clock signal and configured to provide a third set of counter state signals;
- an interrupt decoder/synchronizer unit configured to receive said third set of counter state signals and configured to produce an alternate control interrupt signal; and
- an interrupt source select unit coupled to receive a system control interrupt signal from the motherboard and the alternate control interrupt signal, wherein the interrupt source select unit is configured to provide a control interrupt signal to the microprocessor.

18. The apparatus as recited in claim 17, wherein the interrupt counter unit comprises a sequential digital circuit implementing a binary up counter.

19. The apparatus as recited in claim 17, wherein the control interrupt signal comprises a logical combination of the system control interrupt signal and the alternate control interrupt signal.

20. The apparatus as recited in claim 17, wherein:

the interrupt decoder/synchronizer unit is configured to (i) receive at least one counter state signals from the interrupt counter unit and produce a first alternate control interrupt signal in response thereto, and (ii) receive an input signal from an external pulse generator and produce a second alternate control interrupt signal in response thereto; and the interrupt source select unit is coupled to receive the first and second alternate control interrupt signals and configured to produce the control interrupt signal in response thereto.

21. The apparatus as recited in claim 20, wherein the control interrupt control signal comprises a logical combination of the system control interrupt signal and the first and second alternate control interrupt signals.

* * * * *